US012679098B2

(12) United States Patent
Tomida et al.

(10) Patent No.: US 12,679,098 B2
(45) Date of Patent: Jul. 14, 2026

(54) PRINTING APPARATUS

(71) Applicant: CANON KABUSHIKI KAISHA, Tokyo (JP)

(72) Inventors: Akihiro Tomida, Kanagawa (JP); Keita Ishimi, Kanagawa (JP); Hiroto Kango, Tokyo (JP); Kazuo Suzuki, Kanagawa (JP); Taku Yokozawa, Kanagawa (JP); Rie Takekoshi, Kanagawa (JP); Toshimitsu Danzuka, Tokyo (JP); Akiko Aichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 18/344,787

(22) Filed: Jun. 29, 2023

(65) Prior Publication Data

US 2024/0001678 A1 Jan. 4, 2024

(30) Foreign Application Priority Data

| | | |
|---|---|---|
| Jul. 4, 2022 | (JP) | 2022-107796 |
| Jul. 4, 2022 | (JP) | 2022-107798 |
| Jul. 12, 2022 | (JP) | 2022-111798 |

(51) Int. Cl.
*B41J 2/165* (2006.01)
*B41J 2/18* (2006.01)

(52) U.S. Cl.
CPC ....... *B41J 2/16544* (2013.01); *B41J 2/16526* (2013.01); *B41J 2/18* (2013.01); *B41J 2202/12* (2013.01)

(58) Field of Classification Search
CPC ....... B41J 2/16526; B41J 2/18; B41J 2202/12
See application file for complete search history.

(56) References Cited

U.S. PATENT DOCUMENTS 7,287,825 B2 10/2007 Furuichi et al. ......... B41J 2/165
7,290,858 B2 11/2007 Furuichi et al. ......... B41J 2/205
(Continued)

FOREIGN PATENT DOCUMENTS

EP 4005803 6/2022
JP H07089080 A 4/1995
(Continued)

OTHER PUBLICATIONS

Extended European Search Report dated Feb. 14, 2024 in counterpart EP Application No. 23183036.5.
(Continued)

*Primary Examiner* — Sharon Polk
(74) *Attorney, Agent, or Firm* — Venable LLP

(57) ABSTRACT

A printing apparatus includes an ejection unit that forms an image on a print medium by ejecting liquid from an ejection port using drive of an ejection energy generation element in a pressure chamber, the liquid flowing into the pressure chamber from a first flow passage, a circulation unit circulates the liquid in a circulation flow passage including the first flow passage, the pressure chamber, and a second flow passage to allow the liquid to flow to outside of the pressure chamber, a recovery unit performs a recovery operation of the ejection unit, and a control unit stops the circulation unit before completion of the print operation when the recovery operation is to be performed after the print operation, such that a flow velocity at a timing of the completion of the print operation is a flow velocity higher than a flow velocity at which an ejection characteristic is maintained.

13 Claims, 30 Drawing Sheets

(56) References Cited

U.S. PATENT DOCUMENTS

| | | | | |
|---|---|---|---|---|
| 7,503,638 | B2 | 3/2009 | Sato et al. | B41J 2/165 |
| 7,857,409 | B2 | 12/2010 | Hayashi et al. | B41J 29/38 |
| 8,317,287 | B2 | 11/2012 | Jogo et al. | B41J 29/38 |
| 8,342,626 | B2 | 1/2013 | Kawamata et al. | B41J 11/00 |
| 8,746,828 | B2 | 6/2014 | Kawamata et al. | B41J 29/38 |
| 8,752,930 | B2 | 6/2014 | Doi et al. | B41J 2/045 |
| 8,794,737 | B2 | 8/2014 | Taira et al. | B41J 2/165 |
| 8,882,232 | B2 | 11/2014 | Ibe et al. | B41J 29/393 |
| 8,967,768 | B2 | 3/2015 | Jogo et al. | B41J 23/00 |
| 9,114,651 | B2 | 8/2015 | Kato et al. | B41J 29/393 |
| 9,162,462 | B2 | 10/2015 | Komatsu et al. | B41J 2/165 |
| 9,561,658 | B2 | 2/2017 | Danzuka et al. | B41J 29/393 |
| 9,707,763 | B2 | 7/2017 | Nakagawa et al. | B41J 2/165 |
| 9,862,195 | B2 | 1/2018 | Genta et al. | B41J 2/165 |
| 10,369,797 | B2 | 8/2019 | Genta et al. | B41J 2/165 |
| 10,611,140 | B2 | 4/2020 | Takeuchi et al. | B41J 2/01 |
| 11,020,982 | B2 * | 6/2021 | Vidal, Jr. | B41J 2/18 |
| 11,247,471 | B2 | 2/2022 | Narumi et al. | B41J 2/165 |
| 2016/0303858 | A1 | 10/2016 | Ando et al. | B41J 2/165 |
| 2017/0197420 | A1 | 7/2017 | Okushima et al. | B41J 2/175 |
| 2019/0009522 | A1 | 1/2019 | Fukasawa et al. | B41J 2/045 |
| 2020/0108627 | A1 * | 4/2020 | Nakano | B41J 2/175 |
| 2021/0197555 | A1 | 7/2021 | Fukasawa et al. | B41J 2/045 |
| 2022/0126584 | A1 | 4/2022 | Narumi et al. | B41J 2/165 |
| 2022/0305792 | A1 | 9/2022 | Ishii et al. | B41J 2/165 |
| 2022/0324233 | A1 | 10/2022 | Uetsuki et al. | B41J 2/165 |
| 2022/0388321 | A1 | 12/2022 | Takekoshi et al. | B41J 25/00 |

FOREIGN PATENT DOCUMENTS

| | | |
|---|---|---|
| JP | 2016-199021 | 12/2016 |
| JP | 2017-124617 | 7/2017 |
| JP | 2019-014152 | 1/2019 |
| WO | 2018/001441 | 1/2018 |

OTHER PUBLICATIONS

U.S. Appl. No. 18/340,649, filed Jun. 23, 2023.
U.S. Appl. No. 18/347,273, filed Jul. 5, 2023.
Partial European Search Report dated Nov. 24, 2023 in counterpart EP Application No. 23183036.5.
Communication pursuant to Article 94(3) EPC issued Sep. 2, 2024, in corresponding European Patent Application No. 23183036.5 (4 pages).
Notice of Reasons for Refusal issued May 12, 2026, in corresponding Japanese Patent Application No. 2022-107798, with English translation (7 pages).

* cited by examiner

| | | NECESSARY FLOW VELOCITY (mm/s) | | |
|---|---|---|---|---|
| | | HIGH-IMAGE QUALITY MODE | STANDARD MODE | HIGH-SPEED MODE |
| INK | C | 4 | 3 | 1 |
| | M | 4 | 3 | 1 |
| | Y | 3 | 2 | 1 |
| | BK | 5 | 4 | 2 |

FIG.11

| | | ESTIMATED CIRCULATION FLOW VELOCITY (mm/s) | | | | | | |
|---|---|---|---|---|---|---|---|---|
| ELAPSED TIME (SECONDS) | | 0 | 5 | 10 | 15 | 20 | 25 | 30 |
| INK | C | 11.8 | 7.4 | 3.0 | 1.5 | 0.7 | 0 | 0 |
| | M | 11.8 | 7.4 | 3.0 | 1.5 | 0.7 | 0 | 0 |
| | Y | 12.5 | 7.3 | 2.2 | 1.2 | 0.2 | 0 | 0 |
| | BK | 10.5 | 7.2 | 3.8 | 1.6 | 1.0 | 0.5 | 0 |

FIG.12

| | | ACCEPTABLE CIRCULATION FLOW VELOCITY (mm/s) | | | |
|---|---|---|---|---|---|
| RECOVERY OPERATION | | WIPING | | | SUCTION |
| WIPING MEMBER | | BLADE | NON-WOVEN FABRIC | POROUS MEMBER | |
| INK | C | 0.5 | 1.0 | 0.5 | – |
| | M | 0.5 | 1.0 | 0.5 | – |
| | Y | 0.5 | 1.0 | 0.5 | – |
| | BK | 1 | 2.0 | 1 | – |

FIG.16

| HEAD TEMPERATURE Ht1 | WIPING MEMBER | WAIT TIME Tw (sec) AFTER STOP OF CIRCULATION DRIVE PUMP |
|---|---|---|
| 50°C OR ABOVE | BLADE | 15 |
| | NON-WOVEN FABRIC | 14 |
| | POROUS MEMBER | 15 |
| 25°C OR ABOVE AND BELOW 50°C | BLADE | 20 |
| | NON-WOVEN FABRIC | 18 |
| | POROUS MEMBER | 20 |
| BELOW 25°C | BLADE | 30 |
| | NON-WOVEN FABRIC | 25 |
| | POROUS MEMBER | 30 |

FIG.22

| HEAD TEMPERATURE Ht1 | THERMO-ADJUSTMENT TARGET TEMPERATURE Ht2 |
|---|---|
| 50°C OR ABOVE | – |
| 25°C OR ABOVE AND BELOW 50°C | 50 |
| BELOW 25°C | 60 |

FIG.25

| HEAD TEMPERATURE Ht1 | THERMO-ADJUSTMENT TARGET TEMPERATURE Ht2 | WIPING MEMBER | WAIT TIME Tw (sec) AFTER STOP OF CIRCULATION DRIVE PUMP |
|---|---|---|---|
| 50°C OR ABOVE | – | BLADE | 15 |
| | | NON-WOVEN FABRIC | 14 |
| | | POROUS MEMBER | 15 |
| 25°C OR ABOVE AND BELOW 50°C | 50 | BLADE | 15 |
| | | NON-WOVEN FABRIC | 14 |
| | | POROUS MEMBER | 15 |
| 10°C OR ABOVE AND BELOW 25°C | 60 | BLADE | 15 |
| | | NON-WOVEN FABRIC | 14 |
| | | POROUS MEMBER | 15 |
| BELOW 10°C | | BLADE | 20 |
| | | NON-WOVEN FABRIC | 18 |
| | | POROUS MEMBER | 20 |

FIG.27

PRINTING APPARATUS

CLAIM TO PRIORITY

This application claims the benefit of Japanese Patent Applications No. 2022-107796, filed Jul. 4, 2022, No. 2022-107798, filed Jul. 4, 2022, and No. 2022-111798, filed Jul. 12, 2022, which are hereby incorporated by reference herein in their entirety.

BACKGROUND OF THE INVENTION

Field of the Invention

The present disclosure relates to a recovery operation in a printing apparatus.

Description of the Related Art

There is known a configuration in which, in an inkjet printing apparatus, ink is circulated to pass through flow passages communicating with ejection ports arranged at high density and through pressure chambers corresponding to the ejection ports to suppress an increase in viscosity of the ink in the ejection ports (Japanese Patent Laid-Open No. 2017-124617, here after referred to as the '617 document). In the '617 document, a flow of the ink is generated to pass through the pressure chambers by using a pressure difference between two pressure adjustment mechanisms.

Moreover, in the inkjet printing apparatus, the recovery operation is generally performed by wiping an ejection port arrangement surface of the print head with a wiper blade, or the like. In this case, there may occur so-called color mixing in which inks attached to the ejection port arrangement surface enter the ejection ports and are mixed or a case when foreign substances are pushed into the ejection ports. Color mixing and foreign substances as described above are generally removed by preliminary ejection or a suction operation.

In a configuration in which the ink in the ejection ports is circulated as in the '617 document, in the case when the recovery operation of the ejection port arrangement surface is performed with the ink in the ejection ports circulated, there is a possibility that color mixing ink and foreign substances in the ejection ports enter deep into the circulation flow passage, and cannot be removed. Japanese Patent Laid-Open No. 2016-199021 (hereafter, referred to as the '021 document) describes a configuration in which a circulation pump is stopped in the case when the recovery operation of the ejection port arrangement surface is executed.

However, even in the case when the circulation is stopped in the execution of the recovery operation as in the '021 document, there may occur a time lag to complete stop of the flow velocity of the ink passing through interiors of the ejection ports. For example, in the case when the flow of ink is generated by the pressure difference between the pressure adjustment mechanisms as in the '617 document, the flow of ink may occur in the circulation flow passage including the interiors of the ejection ports, until the pressure difference is eliminated. For example, assume a case when the circulation drive is stopped after the print operation completion and then the recovery of the ejection port arrangement surface is executed. In this case, if the time from the print operation completion to the recovery operation start is short, the recovery operation is executed without the stop of the circulation flow velocity in the ejection ports. In this case, there is a possibility that the color mixing ink or foreign substances enter deep into the flow passages due to the circulation flow velocity, and cannot be removed by the preliminary ejection or the suction operation. As a result, there is a possibility of occurrence of abnormality in tint of a printed image, dot misalignment of ink droplets, and ejection-failure nozzles.

Meanwhile, in the case when the circulation drive is stopped after the completion of the print operation and then wait time to stop of the circulation flow velocity is provided, a start of the recovery operation is resultantly delayed, and there is a possibility that this delay leads to a decrease in productivity.

SUMMARY OF THE INVENTION

A printing apparatus according an aspect of the present disclosure includes an ejection unit configured to perform a print operation of forming an image on a print medium by ejecting liquid from an ejection port by using drive of an ejection energy generation element provided in a pressure chamber, the liquid flowing into the pressure chamber from a first flow passage, a circulation unit configured to circulate the liquid in a circulation flow passage including the first flow passage, the pressure chamber, and a second flow passage configured to allow the liquid in the pressure chamber to flow to an outside of the pressure chamber, a recovery unit configured to perform a recovery operation of the ejection unit, and a control unit configured to stop the circulation unit before completion of the print operation by the ejection unit in the case where the recovery operation is to be performed after the print operation.

Further features of the present invention will become apparent from the following description of exemplary embodiments with reference to the attached drawings.

BRIEF DESCRIPTION OF THE DRAWINGS

FIG. 11 is a table illustrating examples of necessary flow velocities;

FIG. 12 is a diagram illustrating a flow velocity estimation table;

FIG. 16 is a diagram illustrating a table used to set an acceptable value for each of combinations of ink colors and types of recovery operation;

FIG. 22 is a diagram illustrating a table used to determine the wait time after the pump drive stop;

FIG. 25 is a diagram illustrating a table used to determine thermo-adjustment target temperature after the pump drive stop;

FIG. 27 is a diagram illustrating a table used to determine the thermo-adjustment target temperature after the pump drive stop;

DESCRIPTION OF THE EMBODIMENTS

Figure 1:
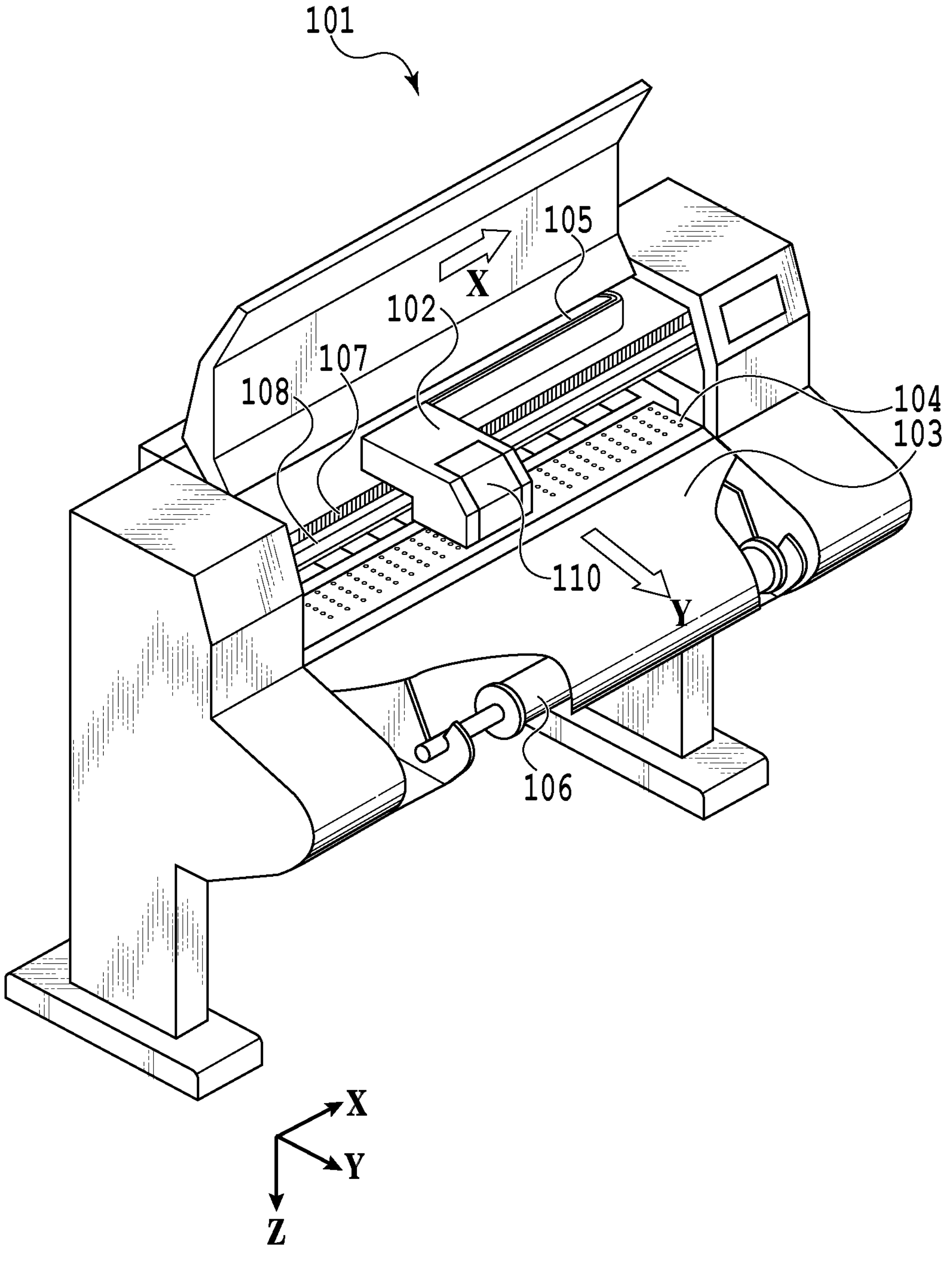
FIG. 1 is a diagram illustrating an outer appearance of a printing apparatus.

Preferable embodiments of the present disclosure are described below in detail with reference to the attached drawings. Note that the following embodiments do not limit the matters of the present disclosure, and not all of combinations of features described in the present embodiments are necessarily essential for the solving means of the present disclosure. Note that the same constituent elements are denoted by the same reference numerals.

In the present specification, "printing" refers to formation of information with meanings such as characters and figures, as well as any information irrespective of whether it has or does not have meanings. Moreover, the "printing" is assumed to widely refer to the case when an image, a design, a pattern, or the like is formed on a print medium or the medium is processed, irrespective of whether or not the image, the design, the pattern, the processing, or the like is apparent such that it can be visually perceived by the human. The "print medium" is assumed to widely refer to paper used in a general printing apparatus as well as cloth, a plastic film, a metal plate, glass, ceramic, wood, leather, or the like, that can receive an ink. The "ink" (referred to as "liquid" in some cases) is to be widely interpreted as in the above definition of "printing". Accordingly, the "ink" refers to a liquid that may be available for the formation of an image, a design, a pattern, or the like, or the processing of the print medium by being applied on the print medium or for processing of an ink (for example, solidification or insolubilization of a color material in the ink applied to the print medium). A "nozzle" collectively refers to an ejection port, a liquid passage communicating with the ejection port, and an element that generates energy used for ink ejection, unless otherwise noted.

A resin, or the like, is generally added to an ink used in an inkjet printing apparatus to increase image quality and achieve high fastness. The addition of resin, or the like, is performed to improve color development by causing a color material to stay on the print medium by increasing the viscosity of the ink with water evaporation or to improve fastness by protecting the color material with a resin film. In the case when ejection ports are arranged at a high density to increase image quality and smaller droplets are ejected, the thickening of the ink due to water evaporation sometimes occurs in the ejection ports. As a result, ejection of ink droplets is hindered and disruption of landing positions of the ink droplets on the print medium or ejection failure occurs, and this may cause a decrease in image quality.

An inkjet printing apparatus of the present embodiments suppresses the thickening of the ink in the ejection ports by circulating the ink such that the ink passes through interiors of the ejection ports. Moreover, a specific description is given below of an example in which, in such an inkjet printing apparatus, a color mixing ink or foreign substance is suppressed from mixing into flow passages in a recovery operation while a decrease in productivity is suppressed.

First Embodiment

<Configuration of Printing Apparatus>

FIG. 1 is a diagram illustrating an outer appearance of an inkjet printing apparatus (hereafter, also simply referred to as printing apparatus) according to the present embodiment. The printing apparatus 101 of the present embodiment is a so-called serial-scan type printer, and prints an image by performing scanning of a print head 110 in an X direction (scanning direction) orthogonal to a Y direction (conveyance direction) in which a print medium 103 is conveyed.

A configuration of the printing apparatus 101 and an outline of an operation in printing are described by using FIG. 1. First, a conveyance roller driven by a conveyance motor 204 (FIG. 2) via a gear conveys the print medium 103 in the Y direction from a spool 106 holding the print medium 103. The fed print medium 103 is conveyed by a paper feed roller and a pinch roller while being held therebetween, and is guided to a print position (scanning region of the print head 110) on a platen 104. Meanwhile, a carriage motor 205 (FIG. 2) causes a carriage unit 102 to perform reciprocation scanning (reciprocal movement) in the X direction along a guide shaft 108 extending in the X direction, at a predetermined conveyance position. The print head 110 is mounted in the carriage unit 102. In this process of scanning, ejection operations from nozzles (ejection ports) of the print head 110 are performed at timings based on position signals obtained by an encoder 107, and printing of a certain band width corresponding to an arrangement range of the ejection ports is performed. Thereafter, the print medium 103 is conveyed, and printing of the next band width is performed. The printing apparatus 101 is configured to print a desired image on the print medium 103 by alternately performing the conveyance of the print medium 103 and the print scanning by the print head 110.

Note that caps 211 included in a recovery unit 210 (FIG. 4) to be described later normally caps a face surface of the print head 110 in a hibernation state. Accordingly, the caps 211 are opened before the printing to set the print head 110 (carriage unit 102) to a scannable state. Thereafter, in the case when data of one scanning is accumulated in a buffer, the carriage motor 205 performs the scanning of the carriage unit 102, and a print operation as described above is performed.

Note that a carriage belt (not illustrated) can be used for transmission of drive force from the carriage motor 205 to the carriage unit 102. Instead of the carriage belt, there may be used, for example, a configuration including a lead screw that is rotationally driven by the carriage motor 205 and that extends in the X direction and an engagement portion that is provided in the carriage unit 102 and that engages with a groove in the lead screw. A different drive method can be used as described above.

Figure 4:
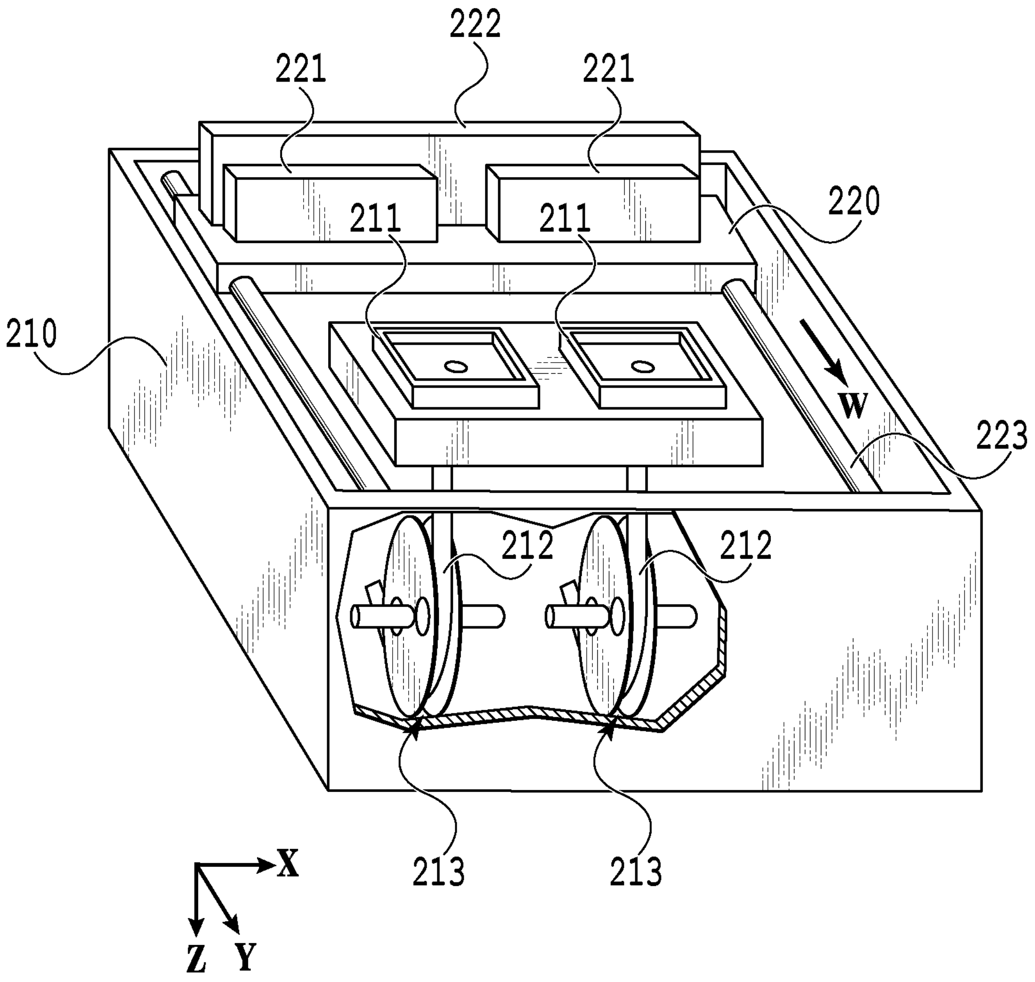
FIG. 4 is a schematic diagram of a recovery unit.

Moreover, each of inks supplied to the print head 110 is supplied by a supply tube 105 from an ink tank 202 (FIG. 5) via the carriage unit 102, the ink tank 202 mounted in a main body of the printing apparatus 101 or an external unit. The ink may be supplied from the ink tank 202 to the print head 110 by using a pressurizing unit. Alternatively, the ink may be supplied by capping an ejection port surface of the print head 110 with the caps 211 of the recovery unit 210 and performing suction by applying negative pressure in the caps with suction pumps 213 (FIG. 4).

The print head 110 may have such a form that multiple print heads 110 that can eject an ink of one color or inks of multiple colors are mounted in the carriage unit 102, or such a form that one print head 110 that can eject inks of multiple colors is mounted in the carriage unit 102. Moreover, the print head 110 may have such a form that one or multiple print heads 110 that can eject an ink of one color are mounted in the carriage unit 102.

<Print Control>

Figure 2:
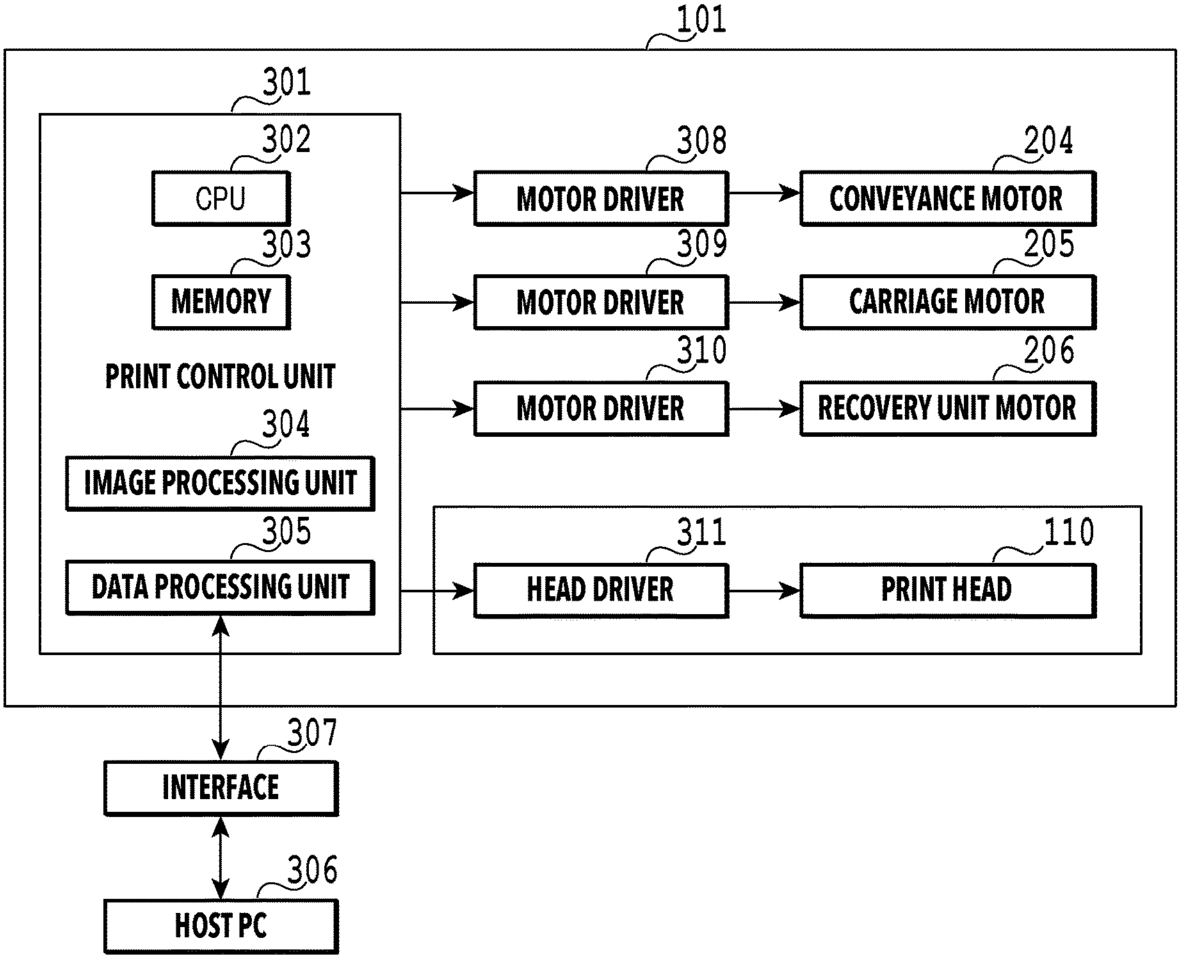
FIG. 2 is a block diagram illustrating a configuration of a print control system in the printing apparatus.

FIG. 2 is a block diagram illustrating a configuration of a print control system in the printing apparatus 101 illustrated in FIG. 1.

The printing apparatus 101 is connected to a data supplying apparatus such as a host computer (hereafter, referred to as host PC) 306 via an interface 307. Various pieces of data, control signals related to printing, and the like, that are transmitted from the host PC 306 are inputted into a print control unit 301 of the printing apparatus 101. The print control unit 301 includes a CPU 302 (may be an ASIC) that is a control computation device and a memory 303 that stores inputted image data, a multivalued gray scale data being an intermediate product, and a multi-pass mask. The print control unit 301 also includes an image processing unit 304 that performs various image processes and a data processing unit 305 that performs various data processes. The processes of the image processing unit 304 and the data processing unit 305 may be executed by the CPU 302. The print control unit 301 controls a motor driver and a head driver to be described later, according to control signals inputted via the interface 307.

The conveyance motor 204 is a motor that rotationally drives the conveyance roller for conveyance of the print medium 103. The carriage motor 205 is a motor that drives the carriage unit 102 in which the print head 110 is mounted in a reciprocating manner. A recovery unit motor 206 is a motor mounted in the recovery unit 210, and operates a wiper guide 223 and the suction pumps 213 (FIG. 4) while switching the unit to drive with a cam shaft. Motor drivers 308, 309, and 310 are drivers that rotationally drive the conveyance motor 204, the carriage motor 205, and the recovery unit motor 206, respectively. A head driver 311 is a driver that drives the print head 110. In the case when multiple print heads are mounted, multiple head drivers 311 as many as the number of print heads are provided.

<Print Head Configuration>

Figure 3:
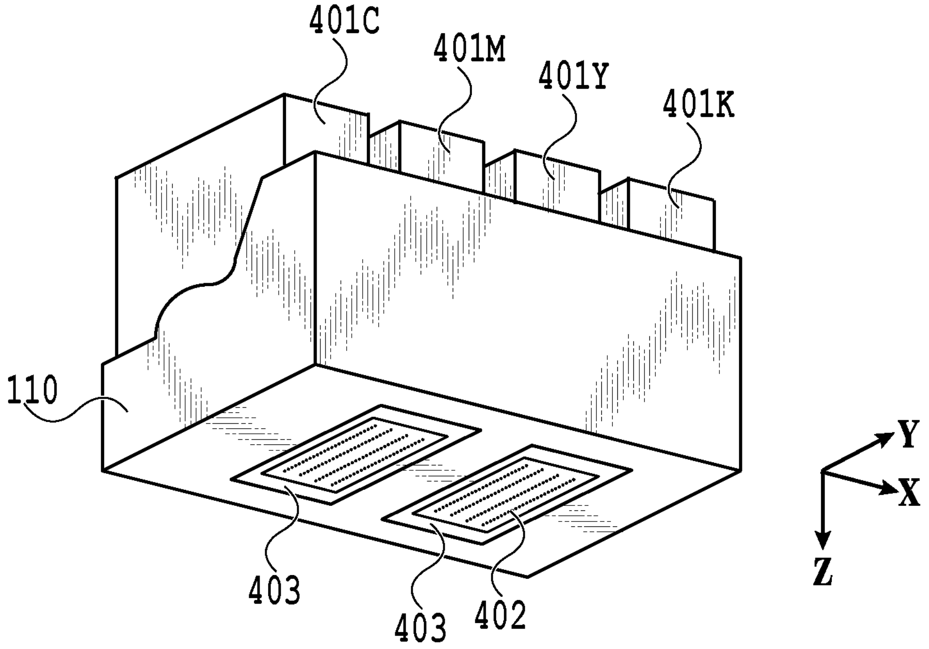
FIG. 3 is a diagram explaining a configuration of a print head.

FIG. 3 is a diagram explaining a configuration of the print head 110 according to the present embodiment. FIG. 3 is a diagram illustrating an example of the print head 110 and an ejection port group configuration. The print head 110 in the present embodiment is provided with independent buffer tanks 401C, 401M, 401Y, and 401BK corresponding to inks of four colors of cyan, magenta, yellow, and black. Although the buffer tanks are illustrated to be visible in FIG. 3 for explanation, the buffer tanks are stored inside the print head 110. Chips 403 in which ejection port arrays corresponding to the respective inks are formed are arranged on a lower surface (+Z direction) of the print head 110. In the chips 403, two rows each with 1024 ejection ports 402 arranged at intervals of 1200 dpi are formed for one color, and one chip can eject two colors. Arranging two chips 403 as described above enables printing with four colors. Note that the ejection port arrays of one color does not have to be arranged on the same straight line, and a total of four ejection port arrays each with 512 ejection ports arranged at intervals of 600 dpi may be arranged while being staggered with respect to one another.

<Recovery Unit>

FIG. 4 is a schematic diagram of the recovery unit 210 according to the present embodiment. The recovery unit 210 includes the caps 211 that cover the ejection port surface of the print head 110 and the suction pumps 213 that suck the inks from the print head 110 with the caps 211 covering the ejection port surface. Moreover, the recovery unit 210 includes first wipers 221 and a second wiper 222 that wipe the ejection port surface of the print head 110. The recovery unit 210 is arranged outside a print region in a movement direction (X direction) of the carriage unit 102. The carriage unit 102 stops at a standby position outside the print region as necessary before a start of the print operation and during the print operation. The recovery unit 210 is arranged at such a position that the recovery unit 210 faces the print head 110 in the case where the carriage unit 102 stops at the standby position.

The caps 211 are supported to be capable being lifted and lowered by a not-illustrated ascending/descending mechanism, and are moved between a lifted position and a lowered position. The caps 211 come into contact with the print head 110 and cover (cap) the ejection port surface of the print head 110 at the lifted position. The caps 211 can suppress evaporation of the inks due to drying of the ejection ports 402 of the print head in cases when the print operation is not performed, by covering the ejection port surface of the print head 110. Moreover, the caps 211 allows the inks to be sucked from the print head 110 by drive of the suction pumps 213 to be described later. Furthermore, the caps 211 is located at the lowered position in the print operation to avoid interference with the print head 110 that moves together with the carriage unit 102. Preliminary ejection can be performed on the caps 211 in the case where the print head 110 moves to a position where it faces the caps 211 with the caps 211 located at the lowered position.

The first wipers (wiper blades) 221 and the second wiper (wiper blade) 222 are formed of elastic members such as rubber. In the present embodiment, there are provided two first wipers 221 that wipe ejection port surfaces of the two chips 403 in FIG. 3, respectively, and the second wiper 222 that wipes the entire ejection port surface including the ejection port arrays. The first wipers 221 and the second wiper 222 are fixed to a wiper holder 220. The wiper holder 220 can be moved in a front-rear direction in FIG. 4 illustrated by the arrow W (arranging direction of the ejection ports in the print head, that is the Y direction) along the wiper guide 223. Moving the wiper holder 220 in the arrow W direction (one direction) in the case when the print head 110 is located at the standby position enables performing of a wiping operation in which the first wipers 221 and the second wiper 222 wipe the ejection port surface while being in contact with the ejection port surface. In the case when the wiping operation is completed, the carriage unit 102 is moved and retracted from a region in which this wiping operation is performed, and then the wiper holder 220 is moved to return the first wipers 221 and the second wiper 222 to original positions (positions before the wiping operation).

Although a description is given in the present embodiment by using the example including the first wipers 221 and the second wiper 222, a configuration including only one type of the wipers may be used. Moreover, although the example in which the wipers are formed of the elastic members such as rubber is described in the present embodiment, the wipers may be formed of members made of a porous material that absorbs the inks. Furthermore, the wipers may have a configuration of a vacuum wiper capable of sucking the ejection port surface. Moreover, although the example in which the wiping is performed only in the case when the wipers are moved in one direction is described in the present embodiment, the configuration may be such that the wiping is performed in the cases when the wipers are moved in both reciprocating directions. Furthermore, although the example in which the wiping direction is the arranging direction (Y direction) of the ejection ports in the print head is described in the present embodiment, the configuration may be such that the wipers are moved in a direction (arranging direction of the ejection port arrays) intersecting (orthogonal to) the arranging direction of the ejection ports. Moreover, in this configuration, the configuration may be such that the wipers are fixed and the ejection port surface is wiped by moving the carriage unit 102 in the scanning direction. Furthermore, the configuration may be such that the wipers are moved in both of the X direction and the Y direction to perform the wiping. Moreover, in a configuration in which the wiping is performed with multiple wiping members or performed in varying wiping directions, recovery units may be arranged at separate positions. In this case, the recovery unit 210 may be divided and arranged in an area near the standby position of the carriage unit 102 and on the opposite side of the print medium to this area.

The suction pumps 213 are driven in a state where the caps 211 cover the ejection port surface of the print head 110 and interiors of the caps 211 are made to be substantially sealed spaces. Negative pressure is thereby generated in the interiors of the caps 211, and a suction operation of sucking the inks from the print head 110 is thus performed. This suction operation is performed in filling of the inks from the ink tanks 202 into the print head 110 (in initial filling), suction removal of dust, sticking matters, air bubbles, or the like, inside the ejection ports (in suction recovery), or the like. The caps 211 are connected to a not-illustrated waste ink absorber via flexible tubes 212.

In the present embodiment, tube pumps are used as the suction pumps 213. Each tube pump includes a holding portion in which there is formed a curved surface portion holding the tube 212 by causing at least part of the tube 212 to extend along a surface of the curved surface portion, a roller that can press the held tube 212, and a roller support portion that rotatably supports the roller. The tube pump rotates the roller support portion in a predetermined direction to rotate the roller while squashing the tube 212. This generates negative pressure in the interior of the corresponding cap 211 and the inks are sucked from the print head 110. The sucked inks are discharged to the waste ink absorber via the tube 212. The suction operation is performed also in discharging of the inks received in the cap 211 by preliminary ejection in the case when the preliminary ejection is performed on the cap 211 by the print head 110. Specifically, driving the suction pump 213 in the case when the inks held in the cap 211 due to the preliminary ejection reaches a predetermined amount allows the inks held in the cap 211 to be discharged to the waste ink absorber via the tube 212.

As described above, the recovery unit 210 performs the recovery operation of recovering the ejection port surface to a normal state. The recovery operation may also be referred to as a cleaning operation. Moreover, the recovery unit 210 may also be referred to as a maintenance unit that performs maintenance of the ejection port surface.

<Ink Circulation>

Figure 5:
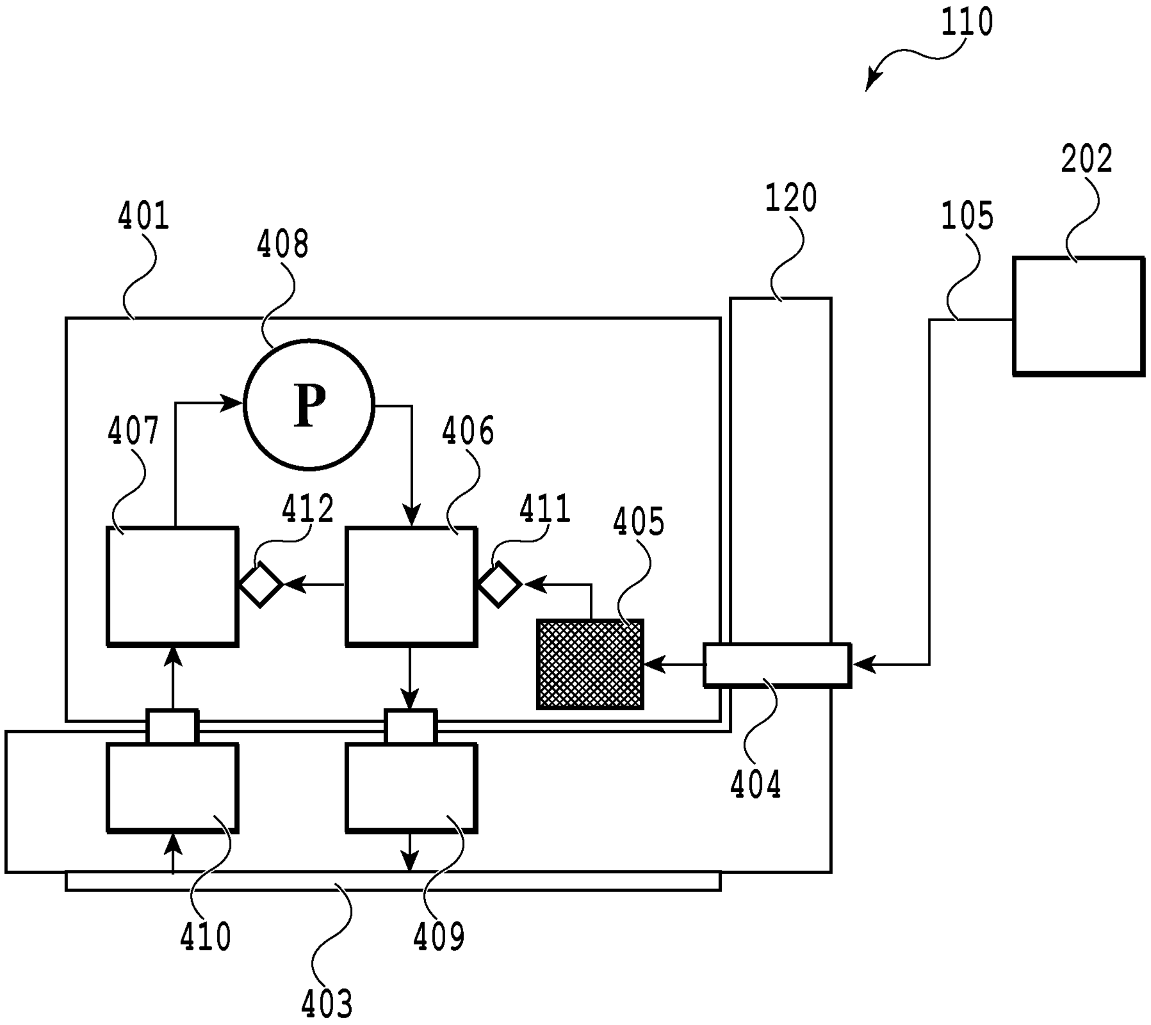
FIG. 5 is a diagram schematically illustrating a configuration of the print head.

FIG. 5 is a diagram schematically illustrating a configuration of the print head 110. FIG. 5 is a schematic diagram of flow passages for one color. In the present embodiment, the buffer tanks and the flow passages for the four colors of cyan, magenta, yellow, and black are assumed to be formed in one print head 110 as described above. The supply tube 105 connected to the ink tank 202 is connected to a joint 404 of a head main body 120 via an interior of the carriage unit 102, and communicates with the buffer tank 401. The supplied ink passes through a filter 405, flows through a flow passage in the buffer tank 401, and reaches a first pressure control member 406. The first pressure control member 406 is connected to a second pressure control member 407 that is another pressure control member via a flow passage, and is connected to the second pressure control member 407 also by another flow passage via a circulation drive pump 408.

A valve 411 that opens in the case when pressure reaches a predetermined negative pressure is provided in an inlet port of the first pressure control member 406. A valve 412 that opens in the case when pressure reaches predetermined negative pressure is provided in an inlet port of the second pressure control member 407. The inlet port of the first pressure control member 406 is provided in the flow passage between the first pressure control member 406 and the filter 405. The inlet port of the second pressure control member 407 is provided in the flow passage between the second pressure control member 407 and the first pressure control member 406. The configuration is such that the negative pressure at which the valve 412 of the inlet port of the second pressure control member 407 opens is higher than the negative pressure at which the valve 411 of the first pressure control member 406 opens.

The ink is supplied from the first pressure control member 406 into the chip 403 via a common supply flow passage 409 formed in the head main body 120. In detail, the ink is supplied from the common supply flow passage 409 to supply flow passages (to be described later) of one or multiple ejection port arrays arranged in the chip 403. Then, the ink is ejected from the ejection ports 402. The ink that is not ejected is collected into the buffer tank 401 via the ejection ports 402. Specifically, the ink having passed the ejection ports 402 flows from collection flow passages (to be described later) in the chip 403, passes through a common collection flow passage 410 formed in the head main body 120, and is collected into the second pressure control member 407.

Figure 6:
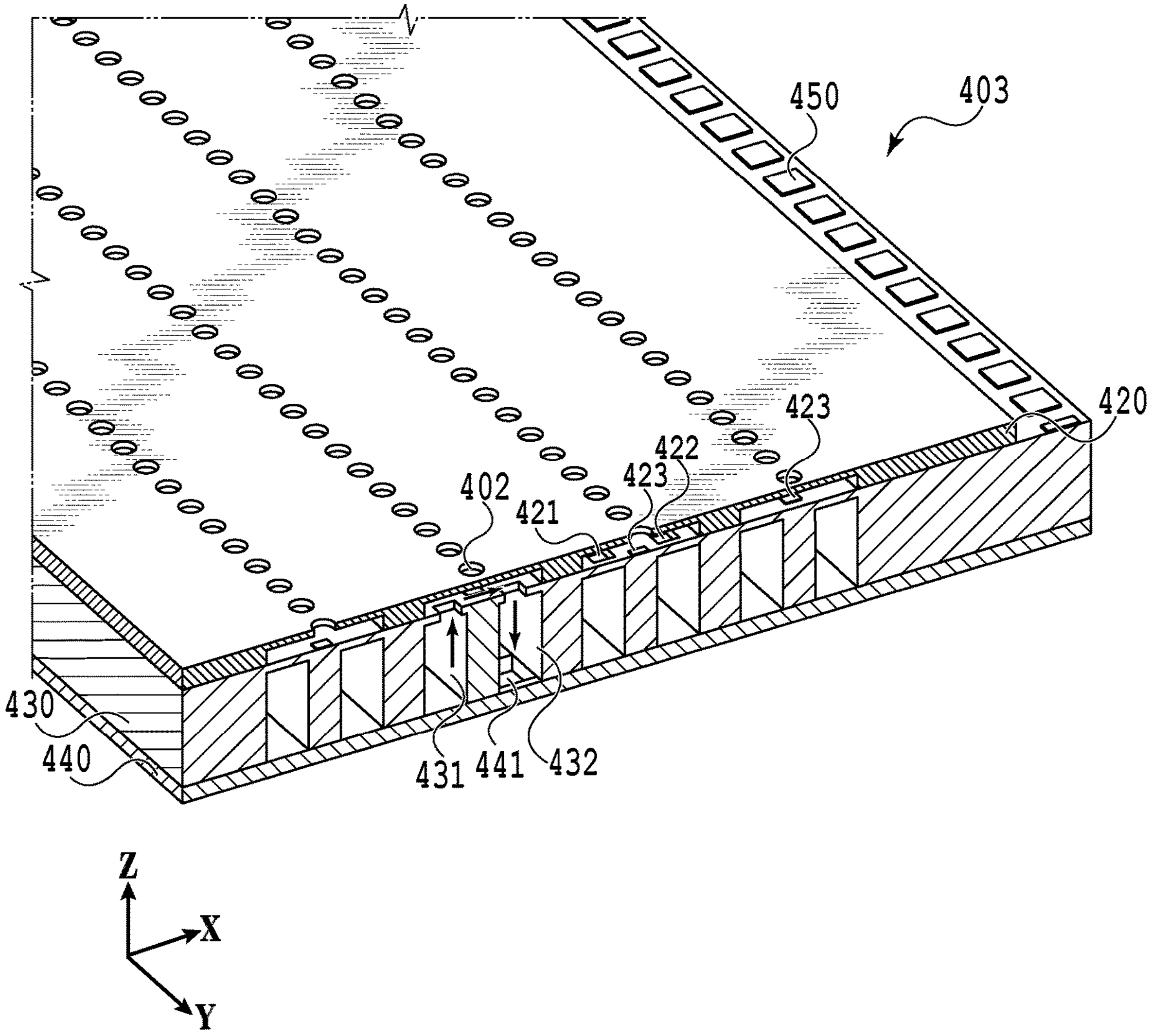
FIG. 6 is a diagram illustrating a configuration of ejection ports and flow passages and a flow of an ink.
Figure 7:
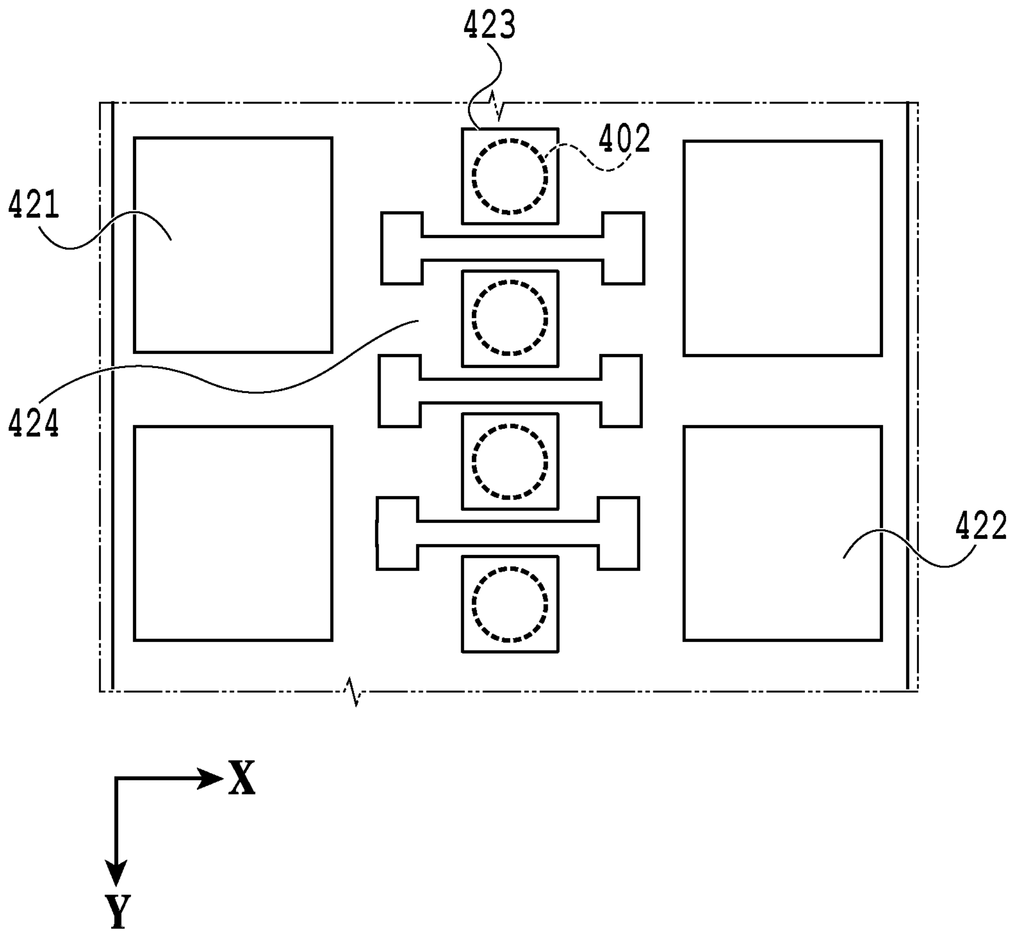
FIG. 7 is a schematic diagram of a bottom surface of a chip.

FIG. 6 is a diagram illustrating a configuration of the ejection ports 402 and the flow passages formed in the chip 403 and a flow of the ink. FIG. 7 is a schematic diagram of a bottom surface (surface on which the ejection ports 402 are arranged) of the chip 403. The configuration of the ejection ports 402 and the flow passages formed in the chip 403 and the flow of the ink are described below by using FIGS. 6 and 7. The ejection ports 402 are formed in an orifice plate 420 on the surface of the chip 403. Ejection energy generating elements 423 that generate ejection energy for ejecting the ink are provided at positions (pressure chambers) corresponding to the ejection ports 402 on a substrate 430. Specifically, the ejection energy generating elements 423 are provided to correspond to the respective ejection ports 402. Thermoelectric conversion elements (heaters), piezoelectric elements, or the like may be used as the ejection energy generating elements 423. In the case when the heaters are used, the heaters generate heat to generate bubbles in the ink in the ejection ports 402, and the ink is ejected from the ejection ports 402 by using this bubbling energy.

In the state where the ink is supplied, the chip 403 is maintained at such negative pressure that menisci are formed on the ejection port surface. Two flow passages of an inlet port 421 and an outlet port 422 are formed, respectively, on both sides of the ejection ports 402. In the present embodiment, one inlet port 421 and one outlet port 422 are arranged to correspond to each two ejection ports 402 as illustrated in FIG. 7. Note that the numbers of the inlet ports 421 and the outlet ports 422 may be such that one inlet port 421 and one outlet port 422 are arranged for each ejection port 402. Moreover, one inlet port 421 and one outlet port 422 may be arranged for each of more than two ejection ports 402. Furthermore, the number of inlet ports 421 does not have to coincide with the number of outlet ports 422. As illustrated in FIG. 6, the inlet port 421 and the outlet port 422 are connected, respectively, to a supply flow passage 431 and a collection flow passage 432 formed to extend in the ejection port array direction (Y direction). The supply flow passage 431 and the collection flow passage 432 are covered with a cover plate 440, and are connected to the common supply flow passage 409 and the common collection flow passage 410 of the head main body 120 via opening portions 441 on the cover plate. One or more opening portions 441 are provided for each of the supply flow passage 431 and the collection flow passage 432. The number of opening portions 441 may be the same or vary between the supply flow passage and the collection flow passage.

Next, a method of supplying the ink to the print head 110 and the buffer tank 401 and a method of circulating the ink in the ejection ports in the present embodiment are described with reference to FIG. 5. The ink reaches the interior of the print head 110 from the ink tank 202 via the supply tube 105 by being pressurized, passes through the filter 405, and flows into the flow passage just before the valve 411 disposed in the inlet port of the first pressure control member 406. In a state where the interior of the print head is filled with the ink at suitable negative pressure such that menisci are maintained on the ejection port surface, the valve 411 disposed in the inlet port of the first pressure control member 406 is in a close state, and the ink does not flow into the first pressure control member 406. Meanwhile, in the case when strong negative pressure is applied to the ejection ports 402 due to the suction operation using the cap 211 of the recovery unit 210 or in the case when negative pressure in the first pressure control member 406 increases in the ejection of the ink from the ejection ports 402 or the like, the valve 411 of the inlet port opens. Then, the ink flows into the first pressure control member 406.

As illustrated in FIG. 5, the first pressure control member 406 and the second pressure control member 407 are connected to the circulation drive pump 408. Driving the circulation drive pump 408 causes the ink to be transferred from the second pressure control member 407 to the first pressure control member 406 via the circulation drive pump 408. The negative pressure in the second pressure control member 407 thereby increases, and the valve 412 of the inlet port of the second pressure control member 407 opens. This causes the ink to flow back from the first pressure control member 406 to the second pressure control member 407. Moreover, since a pressure difference is generated between the first pressure control member 406 and the second pressure control member 407 in this case, a flow of ink passing through the ejection ports 402 is generated. Specifically, the ink passes through the flow passages in order of the first pressure control member 406, the common supply flow passage 409, the opening portion 441 of the cover plate 440, the supply flow passage 431 of each ejection port array, and the inlet ports 421, and partially flows into the ejection ports 402. Moreover, the ink passes through the flow passages in order of the ejection ports 402, the outlet ports 422, the collection flow passage 432, the opening portion 441 of the cover plate 440, and the common collection flow passage 410, and is collected into the second pressure control member 407. Specifically, the flow of the ink in the chip 403 is a flow in the direction of the arrows illustrated in FIGS. 5 and 6. Note that negative pressure and an ink flow velocity in the ejection ports 402 are adjusted to be within such ranges that menisci are maintainable. Specifically, a flow rate of the circulation drive pump 408, a pressure loss of the flow passage between the first pressure control member 406 and the second pressure control member 407, and opening-closing force of each of the valves in the inlet ports are adjusted to adjust the negative pressure and the ink flow velocity in the ejection ports 402.

Driving the circulation drive pump 408 thus generates such a flow that the ink around the ejection ports 402 moves. This can suppress an ink viscosity increase due to drying in the ejection ports during the print operation, and suppress deterioration in ink ejection characteristics.

<Control Processing of Recovery Operation>

In the present embodiment, a description is given of a method of determining a stop timing of circulation drive in the case when the ink in the flow passages extending via the ejection ports is circulated during the print operation and the recovery operation of the ejection port surface is executed after completion of the print operation. Stopping the circulation drive at a suitable timing before the completion of the print operation, that is during the print operation can reduce time to wait for recovery operation start while suppressing effects on a printed image.

Figure 8:
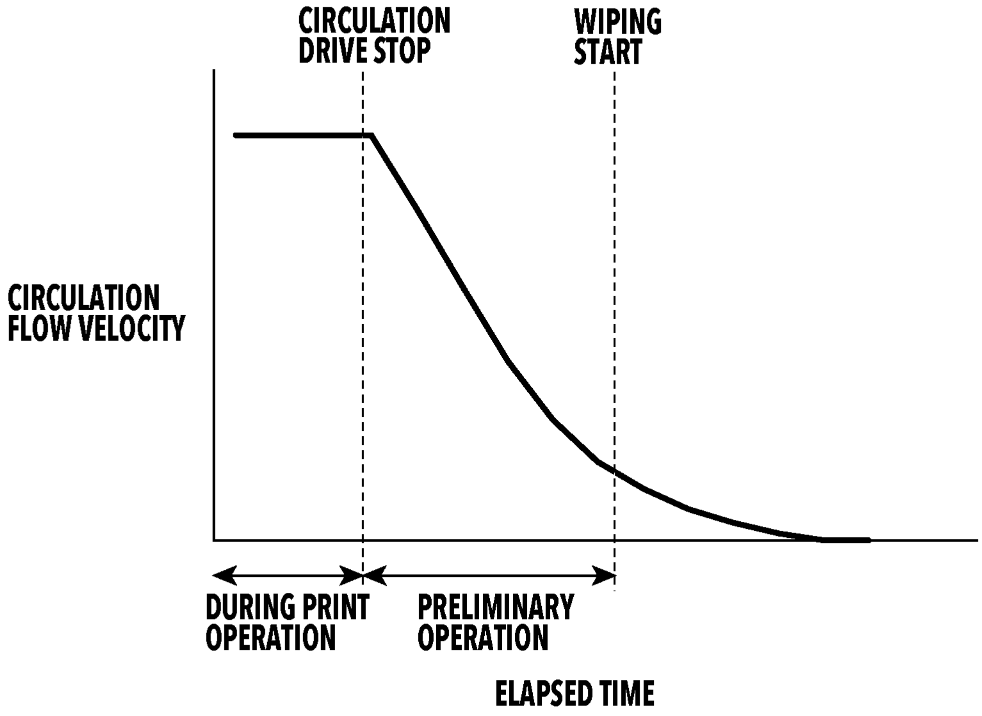
FIG. 8 is a graph illustrating a relationship between a circulation flow velocity and elapsed time.

FIG. 8 is a graph illustrating a relationship between a circulation flow velocity and an elapsed time. FIG. 8 is a graph illustrating the ink flow velocity in a circulation flow passage passing through the ejection ports 402, from a moment during the print operation to a moment of execution of the recovery operation on the ejection port surface after the completion of the print operation. As described above, during the print operation, the circulation drive pump 408 is in a drive state to stabilize the ejection characteristics by circulating the ink in the ejection ports. The ink is thereby circulated in the circulation flow passage.

Assume that no ink is ejected from the ejection ports 402 during the print operation in FIG. 8. Accordingly, a constant pressure difference is generated between the first pressure control member 406 and the second pressure control member 407, and the flow velocity of the ink is also constant. Note that, in the ejection of the ink, the negative pressure in each of the first pressure control member 406 and the second pressure control member 407 temporarily increases, and the pressure difference also changes. However, the valve 411 of the inlet port of the first pressure control member 406 opens, and the ink is supplied from the ink tank 202 to the buffer tank 401, thereby causing the pressure to return to the original pressure state. Although a temporary pressure difference change may occur during the print operation as described above, in the present embodiment, a description is given assuming that no ink is ejected from the ejection ports 402 and the flow velocity of the ink is constant during the print operation for the sake of simplifying the explanation.

In the case when the print operation is completed, the print head 110 returns to the standby position, is subjected to the necessary recovery operation by the recovery unit 210, and is then capped. In FIG. 8, operations up to an initializing operation in which the print head 110 returns to the standby position and the wipers (including the first wipers 221 and the second wiper 222) of the recovery unit 210 are moved to wiping start positions are referred to as a preliminary operation. An example in which the wipers perform the wiping after the preliminary operation is described.

After the completion of the print operation, there is no need to circulate the ink in the ejection ports 402 and to suppress the viscosity increase due to evaporation. Accordingly, in FIG. 8, the print control unit 301 stops the drive of the circulation drive pump 408 at a timing of the completion of the print operation. However, the pressure difference remains in the first pressure control member 406 and the second pressure control member 407 immediately after absence of the circulation flow velocity of the ink generated by the pump drive. Accordingly, the valve 412 of the inlet port of the second pressure control member 407 is open, and the ink thus continuously flows for a certain amount of time in the flow passage between the pressure chambers and the flow passages extending via the ejection ports. The pressure difference between the first pressure control member 406 and the second pressure control member 407 is gradually eliminated by the flow of the ink. Accordingly, the valve 412 closes with elapse of time. Moreover, the ink flows via the ejection ports 402, and the flow velocity of the ink decreases with this flow. After elapse of a certain amount of time, the circulation substantially stops.

In the case when time from the aforementioned circulation drive stop to the wiping start is longer than time from the circulation drive stop to the stop of the circulation flow velocity, the wiping is performed in the state where the circulation flow velocity has stopped. Accordingly, entrance of a color mixing ink and foreign substances deep into the circulation flow passage can be suppressed even in the case where the wiping is started. Meanwhile, in the case when the time from the circulation drive stop to the wiping start is shorter than the time from the circulation drive stop to the stop of the circulation flow velocity, the wiping is performed in the state where the circulation flow velocity has not stopped. Accordingly, the color mixing ink and the foreign substances enter deep into the circulation flow passage. In order to suppress the entrance of the color mixing ink and the foreign substances deep into the circulation flow passage, the wiping is started after waiting for time required for the stop of the circulation flow velocity.

Figure 9A:
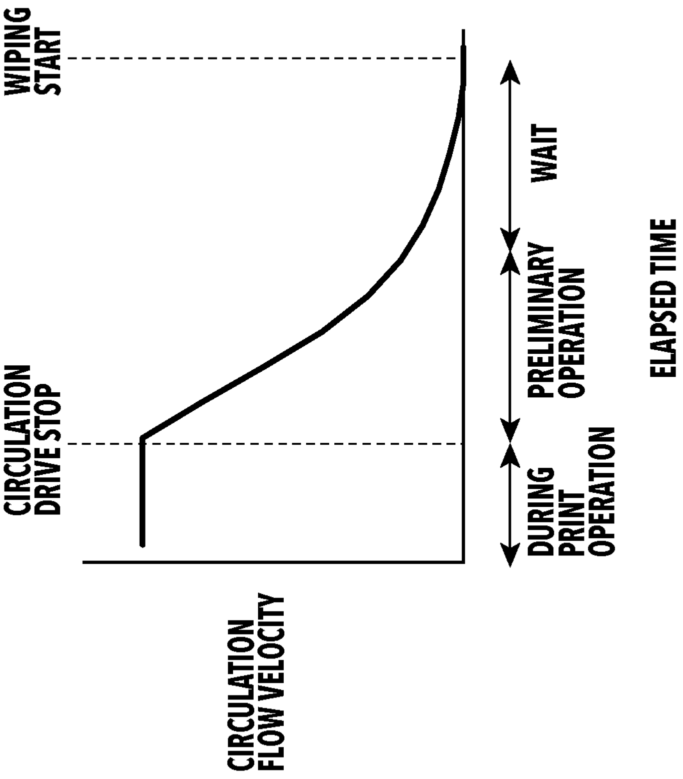
FIGS. 9A and 9B are diagrams illustrating time changes of the circulation flow velocity and operations of the printing apparatus.
Figure 9B:
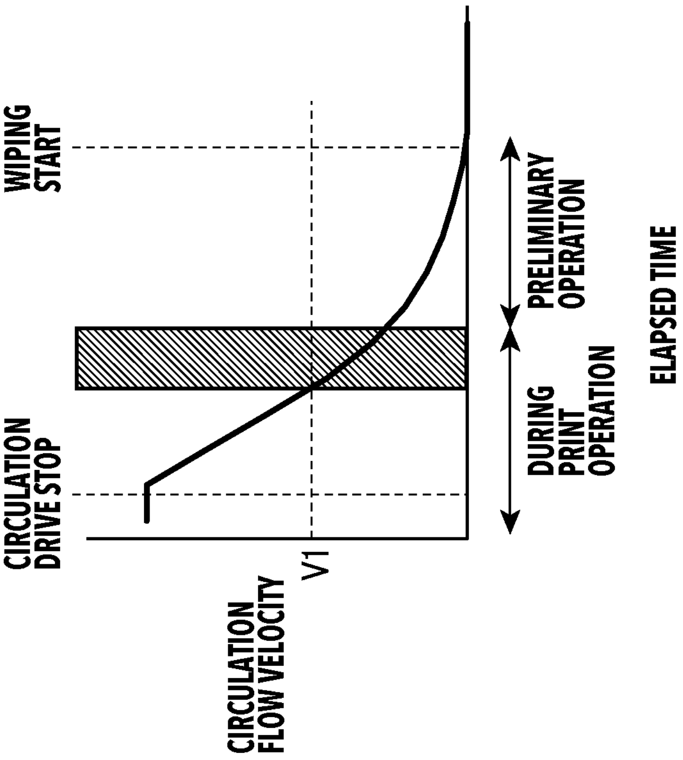

FIGS. 9A and 9B are diagrams illustrating time changes of the circulation flow velocity and operations of the printing apparatus. FIG. 9A illustrates the time change of the circulation flow velocity and the operations of the printing apparatus that may be applied to the case when the time from the circulation drive stop to the wiping start is shorter than the time from the circulation drive stop to the stop of the circulation flow velocity. In FIG. 9A, wait time for which the printing apparatus waits for the flow velocity stop is provided. This wait time is predetermined time added to the aforementioned preliminary operation. As illustrated in FIG. 9A, the wait time provided as described above delays the start of the wiping operation from that in the case of FIG. 8. Accordingly, the start of the print operation for the next print image is also delayed with the delay of the wiping operation. Thus, productivity of the printing apparatus decreases.

Stopping the circulation drive pump 408 during the print operation to stop the ink flow velocity in the circulation flow passage at the wiping start is conceivable as an idea of avoiding such a decrease in productivity. FIG. 9B is a diagram illustrating the time change of the circulation flow velocity and the operations of the printing apparatus in this case. Since the circulation drive pump 408 is stopped during the print operation, the flow velocity of the ink in the ejection ports 402 decreases in a period before the completion of the print operation. In this case, there is a possibility that, in a time of a shaded portion in FIG. 9B, in which the circulation flow velocity becomes lower than a flow velocity V1 necessary for maintaining the ejection characteristics, the ejection characteristics deteriorate due to the viscosity increase caused by the evaporation of the ink. As a result, image quality may decrease due to disruption of landing positions or image failure may occur due to occurrence of ejection-failure nozzles.

Accordingly, in the present embodiment, a description is given of an example of performing control such that the circulation drive pump 408 is stopped at a suitable timing during the print operation to cause the flow velocity in the circulation flow passage to become an acceptable flow velocity at the start of the recovery operation (also referred to as the cleaning operation).

Figure 10:
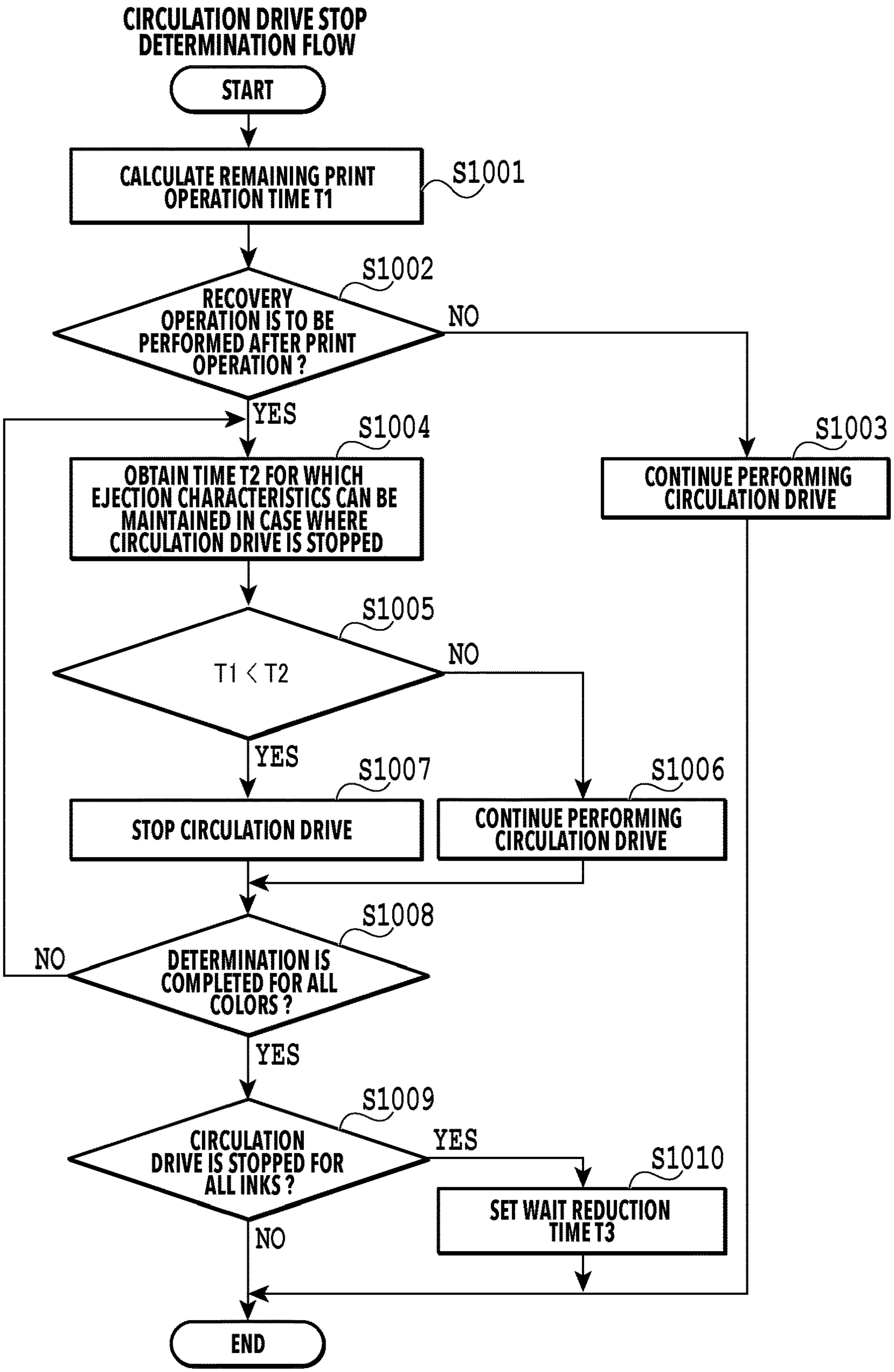
FIG. 10 is a flowchart of determining a circulation drive stop timing during a print operation.

FIG. 10 is a flowchart of determining the circulation drive stop timing during the print operation in the present embodiment. Specifically, FIG. 10 is a diagram illustrating a flowchart of determining the stop timing of the circulation drive pump 408 during the print operation. Note that the processing illustrated in FIG. 10 is executed by the control performed by the print control unit 301 that is achieved by causing the CPU 302 to execute a program stored in the memory 303, or the like. In the present embodiment, the circulation drive stop timing is determined also during the print operation. Accordingly, the processing illustrated in FIG. 10 is processing repeatedly executed at predetermined timings from a moment during the print operation. Note that symbol "S" in description of each of processes means step in this flowchart (the same applies to the other flowcharts described in the present specification).

First, in S1001, the print control unit 301 calculates remaining time T1 of the print operation at this moment. Since an image is formed by serial scanning in the present embodiment, the number of remaining times of scanning is calculated based on an unprinted region of image data and the number of passes in multi-pass printing. Then, the remaining time T1 of the print operation can be calculated based on the number of remaining times of scanning, scanning speed and acceleration of the carriage, and the like.

Next, in S1002, the print control unit 301 determines whether to perform the recovery operation after the completion of the print operation. In the present embodiment, the wiping operation of wiping the ejection port surface is assumed to be performed as the recovery operation. Note that the form of the wiping may be a form using the multiple first wipers 221, a form using the second wiper 222, or a form using both of these wipers. In any case, the time required for the preliminary operation is known. In the case when the print control unit 301 determines that the recovery operation is not to be executed after the completion of the print operation, the processing proceeds to S1003, and the print control unit 301 continues performing the circulation drive, and terminates the circulation drive stop determination flow at this timing. Then, the processing of FIG. 10 is performed again later at a predetermined timing as described above. The determination result of whether to execute the recovery operation may change before the completion of the print operation, depending on a timing at which the determination is executed. For example, in the case when the print control unit 301 performs control of determining whether to execute the recovery operation depending on the amount of inks ejected from the print head 110 and the elapsed time, exceeding of a determination threshold may occur in the middle of the print operation. Since the processing of FIG. 10 is processing repeatedly executed at the predetermined timings during the print operation as described above, in the when where the processing of FIG. 10 is executed at timings before and after the exceeding of the determination threshold, the determination result of S1002 changes. Accordingly, in the present embodiment, the processing of FIG. 10 is repeatedly performed until the print operation is completed (that is, until the circulation drive operation stops) irrespective of the determination result of S1002.

In the case when the print control unit 301 determines that the recovery operation is to be executed after the completion of the print operation in S1002, the processing proceeds to S1004. The processes from S1004 to S1008 are processes repeatedly performed for each ink color. In S1004, the print control unit 301 obtains time T2 for which the ejection characteristics can be maintained in the case when the circulation drive is stopped. Specifically, the time T2 is time for which printing can be performed without impairing of the ejection characteristics, from the circulation drive stop timing. In S1004, the print control unit 301 calculates the time T2 as described below. In the first place, the necessary flow velocity V1 varies depending on the type of ink, a print operation mode, and the like. The necessary flow velocity V1 is a flow velocity at which the ejection characteristics are maintained in a certain type of ink, a certain print operation mode, and the like.

FIG. 11 is a table illustrating examples of the necessary flow velocities corresponding to types of ink and print operation modes. Since a degree of deterioration of the ejection characteristics in the case when the evaporation of the ink near the ejection ports progresses varies depending on the type of ink, the necessary flow velocity is provided for each type of ink. Moreover, the necessary flow velocities are provided depending on the print operation modes. For example, a deterioration in the image quality needs to be further suppressed in a high-image quality mode. Moreover, in the high-image quality mode, since an increase in the number of print passes reduces the ejection frequency per ejection port, a time to execution of the recovery of the ejection characteristics of the ejection port by ejection is longer, and the deterioration in the image quality thereby becomes more apparent. Thus, the necessary flow velocity in the high-image quality mode is set higher than those in the other print modes. The table illustrated in FIG. 11 is stored in advance in, for example, the memory 303, or the like.

In S1004, first, the print control unit 301 obtains the value of the necessary flow velocity V1 of the target ink color, from the necessary flow velocity table illustrated in FIG. 11. For example, in the case when the ink being the target of determination in this operation is cyan (C) and the mode of the print operation is a standard image quality mode, the print control unit 301 refers to the table of FIG. 11 and obtains a flow velocity of 3 mm/s as the necessary flow velocity V1.

FIG. 12 is a diagram illustrating a flow velocity estimation table. FIG. 12 illustrates an estimated circulation flow velocity depending on the elapsed time from the stop of the circulation drive. FIG. 12 illustrates that, in the case of, for example, cyan, if the current circulation flow velocity is 11.8 mm/s, the estimated value of the circulation flow velocity is 7.4 mm/s after lapse of, for example, five seconds from the stop of the circulation drive. Although one type of table is illustrated herein as an example, the processing is performed with reference to a table corresponding to the current circulation flow velocity as appropriate. For example, since the configuration of the present embodiment is such that the pressure difference is constant, the current circulation flow velocity may change depending on the viscosity of the ink. Since the viscosity of the ink changes depending on temperature, it is preferable to store tables corresponding to temperatures in the memory 303. Moreover, the estimated circulation flow velocity may be derived as appropriate by interpolation as necessary.

In the process of S1004, the print control unit 301 having obtained the necessary flow velocity V1 then obtains the circulation flow velocity with respect to the elapsed time from the circulation drive stop, from the flow velocity estimation table illustrated in FIG. 12. Then, the print control unit 301 obtains the time for which the necessary flow velocity V1 can be maintained from the stop of the circulation drive. Specifically, in the table of FIG. 12, the time for which the cyan ink can maintain the flow velocity of 3 mm/s or more that is the necessary flow velocity V1 after the circulation drive stop is ten seconds. In other words, time T2 (cyan)=10 seconds. In S1004, the print control unit 301 thus obtains the time T2 for which the ejection characteristics of the target ink can be maintained in the case where the circulation drive is stopped.

Next, in S1005, the print control unit 301 compares the remaining time T1 of the print operation calculated in S1001 and the time T2 for which the ejection characteristics can be maintained in the case when the circulation drive is stopped. In the case where the time T1 is shorter than the time T2 (in the case when T1<T2), the processing proceeds to S1007. In the case when T1<T2, the ejection characteristics are not impaired till the completion of the print operation even in the case when the circulation drive pump 408 is stopped at this moment. Accordingly, in S1007, the print control unit 301 stops the circulation drive pump 408 circulating the target ink. As described above, since the time T2 varies depending on the ink, the determination is performed separately for each ink, and the circulation drive pumps 408 of the respective inks are independently stopped. Note that, in a circulation flow passage using the temporarily-stopped circulation drive pump 408, the circulation drive pump 408 is stopped based on determination that the ejection characteristics of the target ink are maintained till the completion of the print operation. Accordingly, in the case when the print control unit 301 determines that the stopping of the circulation drive pump 408 is unnecessary due to, for example, a change in the type of recovery operation to be performed after the completion of the print operation during repeated execution of the processing of FIG. 10, or the like, the pump is assumed to be left stopped as it is. Specifically, in the processing of FIG. 10, for the ink for which the processing has proceeded to S1007 once and the circulation drive has been stopped, the processes of S1004 to S1007 may be skipped in the processing of FIG. 10 repeatedly executed at predetermined timings after the circulation drive stop. Alternatively, the print control unit 301 may skip the process of S1007 in the case when the circulation drive of the target ink has been already stopped at the point where the processing proceeds to S1007. After S1007, the processing proceeds to S1008. Meanwhile, if the print control unit 301 determines that the remaining time T1 of the print operation is equal to or longer than the time T2 for which the ejection characteristics can be maintained in the case where the circulation drive is stopped in S1005, the processing proceeds to S1006. In S1006, the print control unit 301 determines that the current processing timing of FIG. 10 is not the timing to stop the circulation drive of the target ink, and the circulation drive of the target ink continues as it is. After S1006, the processing proceeds to S1008.

In S1008, the print control unit 301 determines whether the processing has been completed with all inks set as targets. In the case when there is an unprocessed ink, the print control unit 301 returns to S1004 and repeats the processing. In other words, the processing of FIG. 10 is repeatedly executed at predetermined timings during the print operation, and the processing on all inks are executed at the execution timings. In the case when the print control unit 301 determines that the processing has been completed with all inks set as targets, the processing proceeds to S1009.

In S1009, the print control unit 301 determines whether the circulation drive for all inks is stopped. In the case when the circulation drive for all inks is stopped, the processing proceeds to S1010. In the case when the circulation drive is not stopped for all inks, the processing of FIG. 10 is terminated at this timing. Then, the processing of FIG. 10 is repeated again at the next predetermined timing.

In S1010, the print control unit 301 counts time T3 from the timing at which the circulation drive for all inks is stopped to the completion of the print operation. The moment of S1010 is a timing at which the print operation is being executed. Accordingly, the print control unit 301 counts the time T3 from a timing at which the circulation drive for the last target ink is stopped in S1007 to the completion of the print operation. Specifically, in S1010, the print control unit 301 continuously counts the time T3 until the print operation is completed. This time T3 corresponds to time by which the stop timing of the circulation drive is moved forward from the print operation stop moment that is the original stop timing of the circulation drive. The stop of the circulation flow velocity is advanced by the time T3, and the timing of executing the wiping operation can be advanced. Specifically, after the stop of the circulation drive, the time of the preliminary operation is provided, the wait time is further provided, and then the wiping is started as illustrated in FIG. 9A. This time to the start of the wiping can be reduced by the time T3. In other words, in the execution of the wiping operation, the wiping operation can be executed while excluding the time T3 from the wait time to the stop of the circulation flow velocity.

Figure 13:
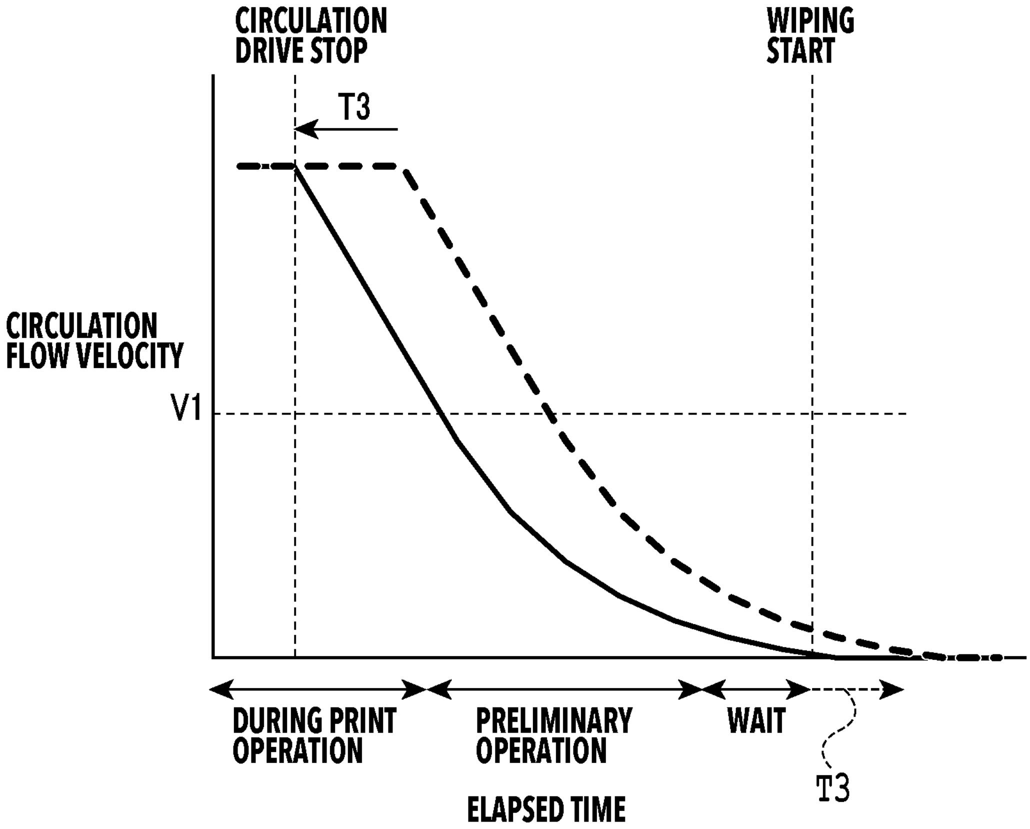
FIG. 13 is a graph illustrating the circulation flow velocity and the elapsed time.

FIG. 13 is a graph illustrating the circulation flow velocity and the elapsed time. In FIG. 13, the timing of the circulation drive stop is a timing during the print operation. Specifically, although the circulation drive is stopped at the timing of the completion of the print operation in FIG. 9A, the circulation drive is stopped during the print operation in FIG. 13. Moreover, in FIG. 13, the state where the circulation flow velocity is higher than the necessary flow velocity V1 is maintained at the timing of the completion of the print operation. Then, in FIG. 13, the wiping is started at a timing obtained by subtracting the time T3 from the wait time, the time T3 being time from the stop of the circulation drive to the completion of the print operation. In other words, the timing of the wiping start can be advanced by the time T3 with the ejection characteristics maintained.

In this description, the timing obtained by subtracting the time T3 from the wait time is set as the wiping start timing. This is because the preliminary operation time from the completion of the print operation to the performing of the wiping operation cannot be reduced. Specifically, the preliminary operation time in which the print head 110 is moved to the position of the recovery operation after the completion of the print operation and the recovery unit 210 is prepared is necessary preparation time. Accordingly, in the case when the circulation flow velocity stops during the preliminary operation, the wiping is started without the wait time after the preliminary operation.

As described above, according to the present embodiment, it is possible to suppress mixing of the color mixing ink or foreign substances into the flow passages in the recovery operation while suppressing a decrease in productivity. In the present embodiment, the execution timing of the wiping operation is determined depending on the timing at which the circulation drive pump 408 is stopped. Specifically, the timing of stopping the circulation drive of each ink is moved forward from the completion of the print operation within such a range that the circulation flow velocity during the print operation does not fall below the flow velocity V1 necessary for maintaining the ejection characteristics. Moreover, the timing of the wiping start is moved forward depending on the moving-forward of the timing of stopping the circulation drive of each ink. This can suppress effects on a printed image after the circulation drive stop while suppressing the decrease in productivity, and suppress the color mixing and the entrance of foreign substances into the flow passages in the wiping.

Second Embodiment

The example in which the recovery operation executed after the completion of the print operation is a fixed recovery operation is described in the first embodiment. Specifically, description is given of the example in which wiping processing using a single type of wiper member is performed. In the first embodiment, since a single type of operation is performed as the recovery operation, the time required for the preliminary operation is fixedly determined. Accordingly, in the first embodiment, a description is given of the example in which the wait time exceeding the preliminary time is adjusted with the time required for the preliminary operation being fixed time.

In the present embodiment, a description is given of an example in which there may be multiple types of recovery operations executable after the completion of the print operation. The preliminary operation time may vary depending on the recovery operation. Moreover, the circulation flow velocity acceptable in the recovery operation may vary depending on the recovery operation. Accordingly, in the present embodiment, the stop timing of the circulation pump during the print operation is determined based on the selected recovery operation. Moreover, the execution timing of the recovery operation is determined based on the circulation flow velocity acceptable in the execution of the selected recovery operation. This can suppress the entrance of foreign substances into the circulation flow passage due to the recovery operation of the ejection port surface while advancing the recovery operation execution timing. Moreover, even in the case when the foreign substances enter the circulation flow passage, flow-in of the foreign substances deep into the circulation flow passage can be suppressed. Accordingly, the foreign substances, or the like, can be easily discharged by the preliminary ejection.

Figure 14:
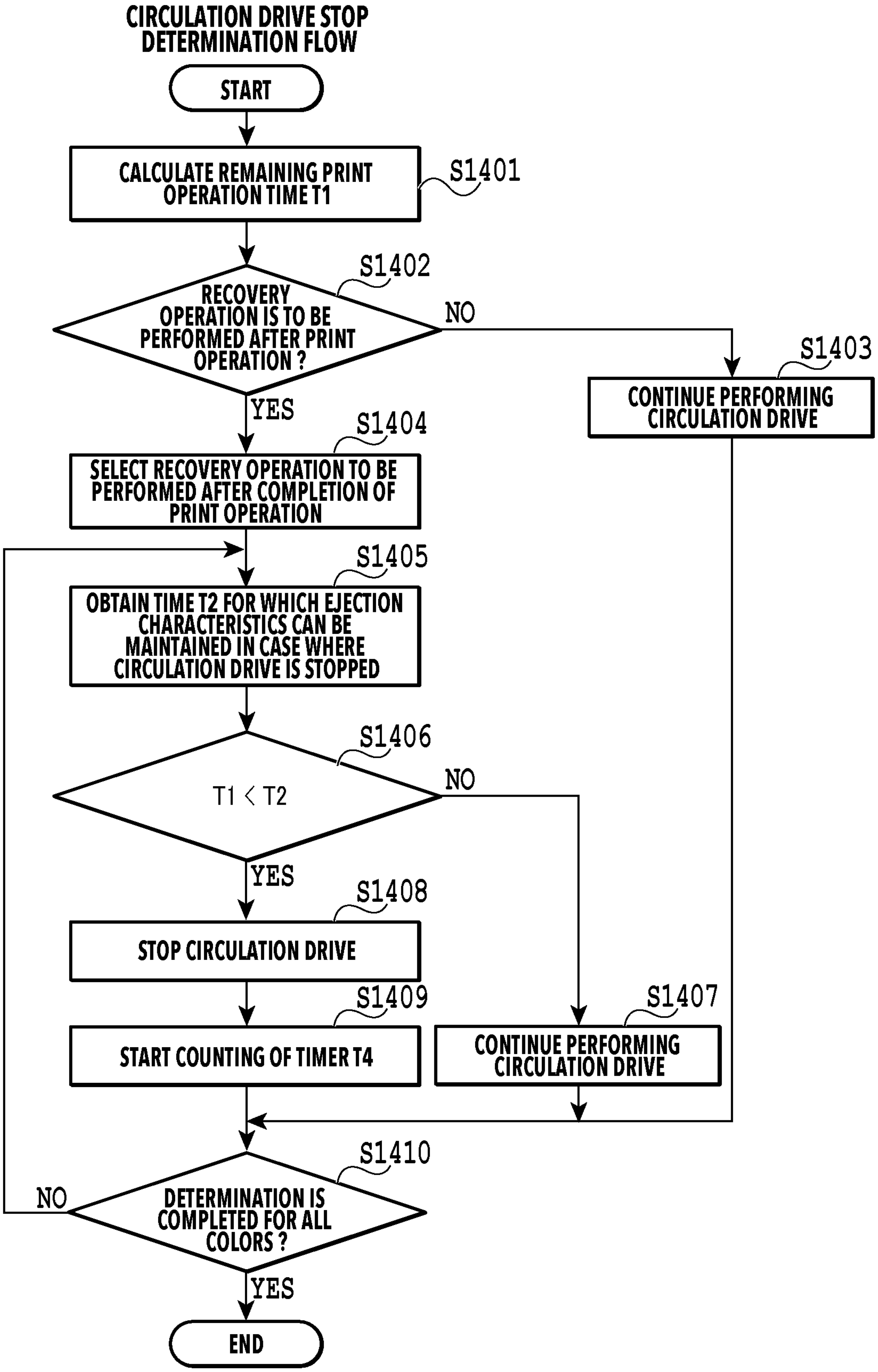
FIG. 14 is a flowchart of determining the circulation drive stop timing during the print operation.

FIG. 14 is a flowchart of determining the circulation drive stop timing during the print operation in the present embodiment. Like the processing described in FIG. 10 in the first embodiment, the processing of FIG. 14 is processing repeatedly performed at predetermined timings during the print operation.

First, in S1401, the print control unit 301 calculates the remaining print operation time T1. The process of S1401 is the same as the process of S1001 in FIG. 10. In S1402, the print control unit 301 determines whether to execute the recovery operation after the print operation. Various types of wiping operations using a wiper blade, a non-woven fabric, a porous material, and the like, can be given as the recovery operation in the present embodiment. Moreover, various types of suction operations such as a suction recovery operation in which suction is performed while the print head is capped and a vacuum wiper operation in which wiping is performed while the suction is performed can be given as the recovery operation. The recovery operation is determined based on a combination of the aforementioned recovery operations and a predetermined sequence configured of the number of times of execution of each recovery operation, selection of the print head for which the recovery is to be executed, a preliminary ejection amount, and the like. In the case when the print control unit 301 determines not to execute the recovery operation in S1402, the processing proceeds to S1403, and the print control unit 301 continues the circulation drive, and terminates the processing at this timing. Meanwhile, in the case when the print control unit 301 determines to execute the recovery operation, the processing proceeds to S1404. In S1404, the print control unit 301 selects the recovery operation and sequence to be executed after the completion of the print operation.

Next, in S1405, the print control unit 301 obtains the time T2 for which the ejection characteristics can be maintained in the case when the circulation drive is stopped. This process is the same as the process described in S1004 of FIG. 10. Specifically, the print control unit 301 obtains the time T2 based on the necessary flow velocity table and the table of the estimated circulation flow velocity with respect to the elapsed time illustrated in FIGS. 11 and 12. Next, in S1406, the print control unit 301 compares T1 and T2. In the case when T1<T2, the processing proceeds to S1408, and the print control unit 301 stops the drive of the circulation drive pump 408 for the target ink. Processes of S1405 to S1408 are the same as the processes of S1004 to S1007 in the first embodiment. In the present embodiment, unlike in the first embodiment, in S1409, the print control unit 301 starts counting elapsed time T4 from the circulation stop, at the timing at which the circulation drive pump 408 of the target ink is stopped in S1408. This because the preliminary operation before the execution of recovery sometimes varies depending on the sequence of the recovery operation selected in S1402 described above. Moreover, there is a case where the position of the carriage unit 102 at the completion of the print operation, a discharge process or a cut operation of the print medium, or the like, varies depending on the selected sequence of the recovery operation. The timing at which the recovery operation is started may change depending on these factors. Specifically, the time of the preliminary operation and the timing at which the recovery operation is started may change depending on the recovery operation. Moreover, as described also in the first embodiment, this circulation drive stop determination flow is repeatedly executed at predetermined timings, and the recovery operation selected in S1404 may change depending on the execution timing. Specifically, there may be a case when a certain recovery operation is first selected in S1404 during the print operation, then exceeding of the determination threshold, or the like, occurs due to a process in the print operation performed thereafter, and another recovery operation is selected in S1404 performed at the subsequent timing. Accordingly, the print control unit 301 counts the time T4 from the circulation stop to appropriately determine whether the start of the recovery operation is possible in a recovery operation execution non-execution determination flow in FIG. 15 to be described later. Moreover, the time T4 is counted for each ink. Since the execution timing of the recovery operation may vary among the inks, the time T4 is independently counted. Specifically, in S1409, the time T4 for the ink for which the circulation drive is stopped in S1408 is counted. Then, the processing proceeds to S1410.

In the case when T1<T2 is not satisfied in S1406, the processing proceeds to S1407, and the print control unit 301 continues the circulation drive of the target ink. Then, the processing proceeds to S1410.

In S1410, the print control unit 301 determines whether the processing is completed with all inks set as targets. In the case when there is an unprocessed target ink, the processing returns to S1405 and is repeated. In the case when the processing is completed with all inks set as targets, the processing of FIG. 14 is terminated. Specifically, in the case when the circulation drive for all inks is stopped in the processing of the circulation drive stop flow in FIG. 14, the print control unit 301 is in a state where it is counting the time T4 for each ink.

Figure 15:
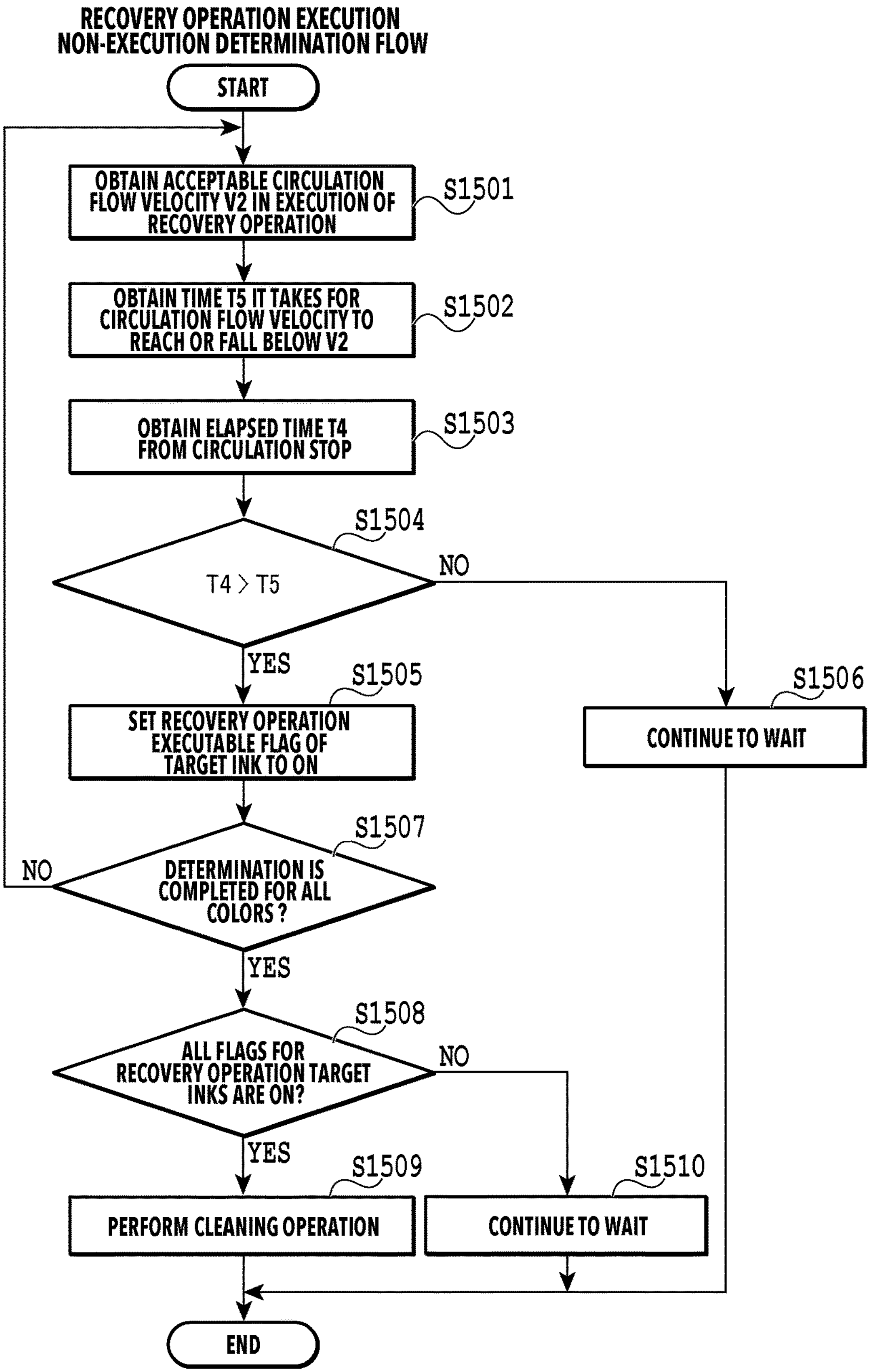
FIG. 15 is a diagram illustrating an example of a flowchart of determining whether to execute a recovery operation or not.

FIG. 15 is a diagram illustrating an example of a flowchart of determining whether to execute the recovery operation or not. The processing of FIG. 15 is processing executed at a timing at which the preliminary operation is completed and the recovery operation becomes executable. Specifically, this processing is processing performed at the timing at which the recovery operation becomes executable after: the circulation drive of the circulation drive pump 408 is stopped in the processing of FIG. 14; then the print operation is completed, and the preliminary operation performed with the completion of the print operation is completed. Note that the preliminary operation performed in this case is the preliminary operation for executing the recovery operation selected in S1404 of FIG. 14. In FIG. 15, at the timing of the start of the recovery operation, the print control unit 301 determines whether to execute the recovery operation based on the estimated ink flow velocity in the circulation flow passage. The processing of FIG. 15 is also processing repeatedly executed by the print control unit 301 at predetermined timings in a period from a moment after the timing at which the recovery operation becomes executable to the actual execution of the recovery operation. Moreover, processes from S1501 to S1507 are processes performed for each ink color.

First, in S1501, the print control unit 301 sets an acceptable value V2 (also referred to as predetermined flow velocity) of the circulation flow velocity in the recovery operation that corresponds to the recovery operation selected in S1404. FIG. 16 is a diagram illustrating a table used to set the acceptable value V2 for each of combinations of the ink colors and the types of recovery operation. In the present embodiment, the table illustrated in FIG. 16 is held in advance in the memory 303. In S1501, the print control unit 301 refers to a table value of the selected recovery operation, and determines the acceptable value V2 of the circulation flow velocity in the recovery operation. For example, in the case when the ejection port arrays of the cyan ink are to be wiped with the first wipers 221 and the second wiper 222 that are the wiper blades of the recovery unit 210, V2=0.5 mm/s. In the case when a recovery unit including multiple wiping members are used, the acceptable value V2 of the circulation flow velocity may be changed depending on the member to be used for the wiping. In this case, for example, in a wiping member with high absorbability such as a non-woven fabric, the amount of ink that enters the ejection ports due to the wiping is less than that in the wiper blade being the elastic member. Accordingly, the acceptable value V2 may be large. Moreover, in the case of the suction operation, the ink is sucked out from the ejection ports by applying negative pressure to the cap unit. Accordingly, the suction operation may be executed immediately after the preliminary operation without the setting of the acceptable flow velocity, assuming that there is no effect of presence or absence of the circulation flow velocity. In the table of FIG. 16, no acceptable value is specified for the case when the suction operation is performed. Moreover, for example, in the case when the recovery operation is such a sequence that the suction operation is performed and then the wiping operation is performed, no high circulation flow velocity is generated unless the circulation drive pump 408 is driven again after the suction operation. Accordingly, the wiping can be executed without provision of the wait time even in the sequence including the wiping operation. Although the processing according to the table illustrated in FIG. 16 is described in the present embodiment, for example, in the case when the acceptable value V2 is uniformly set to "0", the processing substantially the same as the processing described in the first embodiment is performed.

Next, in S1502, the print control unit 301 obtains time T5 it takes for the circulation flow velocity to reach or to fall below the acceptable value V2. The print control unit 301 refers to the flow velocity table illustrated in FIG. 12. Then, the print control unit 301 determines the time T5 it takes for the flow velocity to reach or to fall below the acceptable value V2 set in S1501 (reaches or falls below the predetermined flow velocity) from the circulation drive stop, by referring to the table illustrated in FIG. 12. In the case when the table includes no flow velocity value matching the acceptable value V2 of the circulation flow velocity, T5 may be determined by performing linear interpolation using estimated flow velocity values above and below the acceptable value V2. For example, in the case when V2 of cyan ink=0.5 mm/s, the time T5 is about 21.4 seconds as a result of the linear interpolation. Specifically, in the case when the time T5 (about 21.4 seconds) elapses from the stop of the circulation drive, the flow velocity falls to the circulation flow velocity at which the selected recovery operation is acceptable. Accordingly, as described in subsequent S1504, the print control unit 301 can determine whether to execute the recovery operation by comparing the time T5 and the elapsed time T4 that is a timer from the stop of the circulation drive.

Although the example in which the print control unit 301 refers to the table defining the estimated flow velocity value and the elapsed time from the circulation drive stop is described in the present embodiment, the configuration is not limited to this. The flow velocity of the ink in the circulation flow passage may be actually measured. Moreover, the determination of whether the flow velocity falls below the acceptable value V2 may performed by calculating the flow velocity based on the ink flow rate in the circulation flow passage, the pressure difference between the first pressure control member 406 and the second pressure control member 407, and the like. In this case, since whether the recovery operation is to be executed or not can be determined irrespective of the elapsed time T4 from the circulation drive stop, there is no need to count the elapsed time T4.

In S1504, the print control unit 301 performs determination by comparing T4 and T5. In the case when T4>T5, the processing proceeds to S1505, and the print control unit 301 determines that the target ink is in a recovery operation executable state, and sets a recovery operation executable flag for the target ink to ON. Then, the processing proceeds to S1507. Meanwhile, in the case where T4≤T5, the processing proceeds to S1506, and the print control unit 301 determines to continue to wait without starting the recovery operation, and terminates the processing at this timing.

The processes of S1501 to S1506 described above are executed for each of the inks by the determination of S1507. In the case when all of the recovery operation executable flags for the inks being targets of the recovery operation are ON in determination of S1508, the processing proceeds to S1509, and the print control unit 301 executes the recovery operation. Meanwhile, in the case when not all of the recovery operation executable flags for the inks are ON in the determination of S1508, the processing proceeds to S1510, and the print control unit 301 continues to wait, and terminates the present flow. In this case, the processing of FIG. 15 is executed again later at a predetermined timing.

Figure 17:
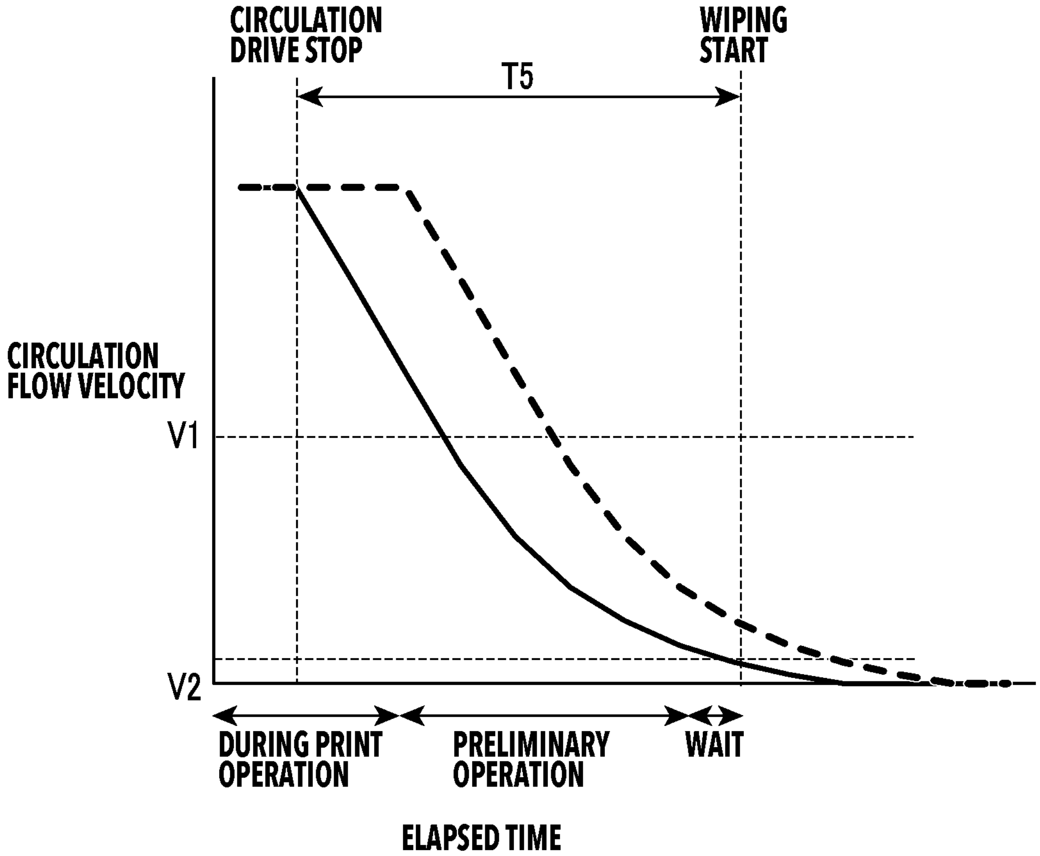
FIG. 17 is a diagram illustrating an execution timing at which the recovery operation is executed.

FIG. 17 is a diagram illustrating an execution timing at which the recovery operation is executed in S1509. In FIG. 17, the circulation drive is stopped during the print operation. Moreover, at the timing of the completion of the print operation, the circulation flow velocity maintains the necessary flow velocity V1. Furthermore, the wiping is executed at a timing at which the time T5 elapses, the time T5 being time it takes for the circulation flow velocity to reach or fall below the acceptable value V2 from the timing of the stop of the circulation drive. Although the circulation is not completely stopped at this moment, the flow velocity is below the acceptable value V2. Accordingly, mixing of foreign substances, or the like, deep into the ejection ports can be suppressed even if the recovery operation is executed.

Note that, in the present embodiment, a description is given of the example in which the determination is repeatedly executed by managing the recovery operation executable flag for each ink in consideration of variation in the executed contents of the recovery operation depending on the ink color. However, the configuration is not limited to this. For example, in the case when the same recovery operation is to be executed simultaneously for the ejection ports of all inks, the count of the timer for the aforementioned elapsed time T4 may be started according to the count for the ink whose count start is the latest. Moreover, the comparison of the elapsed time T4 and the time T5 it takes for the circulation flow velocity to reach or fall below the acceptable value may be such that the recovery start timing is determined at a stage where the circulation drive is stopped for all ink colors and the type of the recovery operation to be performed after the print operation is determined. Specifically, although the example in which the processing of FIG. 15 and the processing of FIG. 14 are executed at different timings is described in the present embodiment, the processing corresponding to FIG. 15 may be incorporated in the circulation drive stop determination flow in FIG. 14.

As described above, according to the present embodiment, the recovery operation may be executed at a suitable timing also in execution of a recovery sequence in which multiple recovery operations may be performed. In the present embodiment, the execution timing of the recovery operation is determined depending on the timing of the stop of the circulation drive pump 408. The timing of stop of the circulation drive pump 408 is such a timing that no effect on the ejection characteristics occurs at the completion of the print operation. Moreover, the timing of executing the recovery operation is a timing at which the ink flow velocity in the circulation flow passage reaches or falls below the acceptable flow velocity for each ink. This suppresses the amount of ink or foreign substances entering deep into the circulation flow passage in the recovery operation, and the amount of the ink or foreign substances can be controlled to be within a range dischargeable in the preliminary ejection. As a result, it is possible suppress occurrence of troubles such as deterioration of the ejection characteristics and a change in color tone of a printed image due to mixing of the ink in the circulation flow passage with the entering ink.

Third Embodiment

In the present embodiment, a description is given of an example of suppressing mixing of the color mixing ink or foreign substances into the flow passages in the recovery operation while suppressing the decrease in productivity by using the temperature of the print head. Note that, since the basic configuration is the same as that in the example described in the first embodiment, a description is given mainly of differences, and the like.

Figure 18:
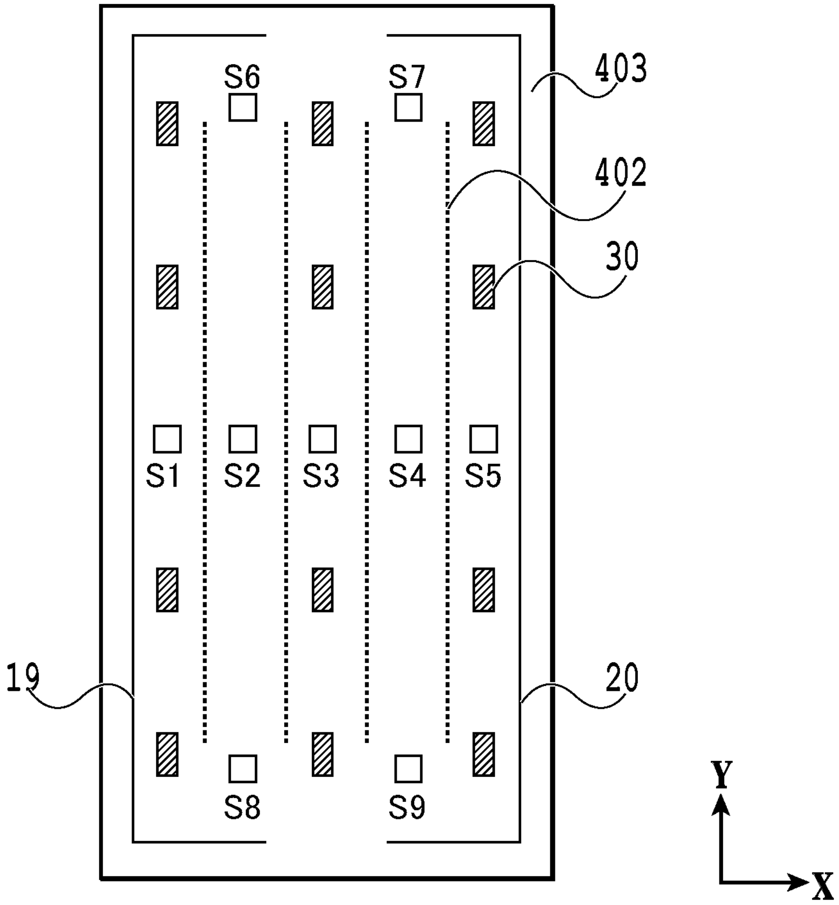
FIG. 18 is a diagram explaining a configuration of the print head.

FIG. 18 illustrates a plan view explaining a detailed configuration of the chip 403. Temperature sensors S6, S7, S8, and S9 for detecting the temperature of the chip 403 are formed on the chip 403, in end portions thereof in the arranging direction (Y direction) of the ejection ports 402. The temperature sensors S6 to S9 are formed of diodes. The temperature sensors S6 to S9 are each arranged at a position that is away from outermost ejection port positions of the ejection port arrays by about 0.2 mm in a sub-scanning direction (arranging direction of the ejection ports, Y direction) and that is an intermediate position between two ejection port arrays in a main scanning direction (X direction). Temperature sensors S1, S2, S3, S4, and S5 for detecting center portion temperature of the ejection port arrays are formed in a center portion in the arranging direction of the ejection ports 402. The temperature sensors S1 to S5 are also formed of diodes. The temperature sensors S1 to S5 are also each arranged at an intermediate position between two ejection port arrays.

Temperature maintaining heaters 19 and 20 are formed to surround the chip 403. The temperature maintaining heaters 19 and 20 are located on the outer sides of the outermost ejection port arrays to be away therefrom by 1.2 mm in the main scanning direction (X direction), and on the outer sides of the temperature sensors S6 to S9 to be away therefrom by 0.2 mm in the sub-scanning direction (Y direction). Note that the overall size of the chip 403 is horizontal size×vertical size (9.55 mm×39.0 mm).

Moreover, heating elements 30 capable of heating the chip 403 are arranged in the chip 403. The heating elements 30 perform temperature adjustment control (also referred to as thermo-adjustment control). The temperature adjustment control in the present embodiment is control of heating the ink to constant temperature such that a change in the viscosity of the ink in the print head 110 is suppressed and the viscosity is maintained constant without being affected by environmental temperature. A not-illustrated driver (driving unit) is arranged in the print head 110, and is connected to each of the heating elements 30 to be capable of performing control of turning a drive current of the heating element 30 ON and OFF.

<Composition of Ink>

Next, the inks used in the present embodiment are described. In the following description, "parts" and "%" are based on mass unless otherwise noted.

(Black Ink)

(1) Preparation of Pigment Dispersion Liquid

First, anionic polymer P-1 [styrene/butyl acrylate/acrylic acid copolymer (polymerization ratio (weight ratio)=30/40/30) acid value 202, weight-average molecular weight 6500] is prepared. This polymer is neutralized with a potassium hydroxide aqueous solution, and is diluted with deionized water to prepare a homogenous 10% by mass polymer aqueous solution.

Then, 100 g of the aforementioned polymer solution, 100 g of carbon black, and 300 g of deionized water are mixed and mechanically agitated for 0.5 hours. Next, a microfluidizer is used to process this mixture by passing the mixture through an interaction chamber five times under liquid pressure of about 70 MPa. Moreover, a dispersion liquid obtained in the aforementioned processing is subjected to centrifugal processing (12,000 rpm, 20 minutes) to remove non-dispersed substances including coarse particles, and a black dispersion liquid is obtained. The obtained black dispersion liquid has a pigment concentration of 10% by mass and a dispersant concentration of 6% by mass.

(2) Preparation of Resin Fine Particle Dispersion Liquid

First, the following three additive liquids are added little by little dropwise while being agitated with a motor in a heated state of 70° C. under a nitrogen atmosphere, and polymerization is performed for five hours. The additive liquids are a hydrophobic monomer formed of 28.5 parts of methyl methacrylate, a mixed liquid containing a hydrophilic monomer formed of 4.3 parts of sodium p-styrenesulfonate and 30 parts of water, and a mixed liquid containing a polymerization initiator formed of 0.05 parts of potassium persulfate and 30 parts of water.

(3) Preparation of Ink

In preparation of the ink, the aforementioned black dispersion liquid and the aforementioned resin fine particle dispersion liquid are used. The following components are added to these liquids to achieve a predetermined concentration, and are sufficiently mixed and agitated. Then, a mixture is filtered under pressure with a micro filter (manufactured by Fujifilm Corporation) with a pore size of 2.5 m to prepare a pigment ink with a pigment concentration of 5% by mass and a dispersant concentration of 3% by mass.

Aforementioned black dispersion liquid 50 parts

Aforementioned resin fine particle dispersion liquid 10 parts 2-methyl-1,3-propanediol 15 parts 2-pyrrolidone 5 parts Acetylene glycol EO adduct 0.5 parts Deionized water (manufactured by Kawaken Fine Chemicals Co., Ltd.) balance (Cyan Ink)

(1) Preparation of Dispersion Liquid

First, an AB block polymer with an acid value of 250 and a number average molecular weight of 3000 is formed by an ordinary method while using benzyl acrylate and methacrylic acid as raw materials. Then, the AB block polymer is neutralized with a potassium hydroxide aqueous solution, and is diluted with deionized water to prepare a homogenous 50% by mass polymer aqueous solution.

Then, 180 g of the aforementioned polymer solution, 100 g of C.I. pigment blue 15:3, and 220 g of deionized water are mixed and mechanically agitated for 0.5 hours.

Next, a microfluidizer is used to process this mixture by passing the mixture through an interaction chamber five times under liquid pressure of about 70 MPa.

Moreover, a dispersion liquid obtained in the aforementioned processing is subjected to centrifugal processing (12,000 rpm, 20 minutes) to remove non-dispersed substances including coarse particles, and a cyan dispersion liquid is obtained. The obtained cyan dispersion liquid has a pigment concentration of 10% by mass and a dispersant concentration of 10% by mass.

(2) Preparation of Resin Fine Particle Dispersion Liquid

A resin fine particle dispersion liquid is prepared by using the same raw materials and preparation method as those described for the black ink.

(3) Preparation of Ink

In preparation of the ink, the aforementioned cyan dispersion liquid is used, and the following components are added to this liquid to achieve a predetermined concentration. Next, these components are sufficiently mixed and agitated, and then filtered under pressure with a micro filter (manufactured by Fujifilm Corporation) with a pore size of 2.5 m to prepare a pigment ink with a pigment concentration of 2% by mass and a dispersant concentration of 2% by mass.

Aforementioned cyan dispersion liquid 20 parts

Aforementioned resin fine particle dispersion liquid 10 parts 2-methyl-1,3-propanediol 15 parts 2-pyrrolidone 5 parts Acetylene glycol EO adduct 0.5 parts Deionized water (manufactured by Kawaken Fine Chemicals Co., Ltd.) balance (Magenta Ink)

(1) Preparation of Dispersion Liquid

First, an AB block polymer with an acid value of 300 and a number average molecular weight of 2500 is formed by an ordinary method while using benzyl acrylate and methacrylic acid as raw materials. Then, the AB block polymer is neutralized with a potassium hydroxide aqueous solution and is diluted with deionized water to prepare a homogenous 50% by mass polymer aqueous solution.

Then, 100 g of the aforementioned polymer solution, 100 g of C.I. pigment red 122, and 300 g of deionized water are mixed and mechanically agitated for 0.5 hours.

Next, a microfluidizer is used to process this mixture by passing the mixture through an interaction chamber five times under liquid pressure of about 70 MPa.

Moreover, a dispersion liquid obtained in the aforementioned processing is subjected to centrifugal processing (12,000 rpm, 20 minutes) to remove non-dispersed substances including coarse particles, and a magenta dispersion liquid is obtained. The obtained magenta dispersion liquid has a pigment concentration of 10% by mass and a dispersant concentration of 5% by mass.

(2) Preparation of Resin Fine Particle Dispersion Liquid

A resin fine particle dispersion liquid is prepared by using the same raw materials and preparation method as those described for the cyan ink.

(3) Preparation of Ink

In preparation of the ink, the aforementioned magenta dispersion liquid is used, and the following components are added to this liquid to achieve a predetermined concentration. Next, these components are sufficiently mixed and agitated, and then filtered under pressure with a micro filter (manufactured by Fujifilm Corporation) with a pore size of 2.5 μm to prepare a pigment ink with a pigment concentration of 4% by mass and a dispersant concentration of 2% by mass.

Aforementioned magenta dispersion liquid 40 parts

Aforementioned resin fine particle dispersion liquid 10 parts 2-methyl-1,3-propanediol 15 parts 2-pyrrolidone 5 parts Acetylene glycol EO adduct 0.5 parts Deionized water (manufactured by Kawaken Fine Chemicals Co., Ltd.) balance (Yellow Ink)

(1) Preparation of Dispersion Liquid

First, the aforementioned anionic polymer P-1 is neutralized with a potassium hydroxide aqueous solution and diluted with deionized water to prepare a homogenous 10% by mass polymer aqueous solution.

Then, 30 parts of the aforementioned polymer solution, 10 parts of C.I. pigment yellow 74, and 60 parts of deionized water are mixed and fed into a batch-type vertical sand mill (manufactured by IMEX Co., Ltd.), 150 parts of zirconia beads with a diameter of 0.3 mm are charged, and dispersion processing is performed for 12 hours while performing water cooling.

Then, the dispersion liquid obtained in the aforementioned processing is subjected to centrifugal processing to remove non-dispersed substances including coarse particles, and a yellow dispersion liquid is obtained. The obtained yellow dispersion liquid has a solid content of about 12.5% and a weight average particle size of 120 nm (2) Preparation of Resin Fine Particle Dispersion Liquid A resin fine particle dispersion liquid is prepared by using the same raw materials and preparation method as those described for the cyan ink.

(3) Preparation of Ink

The following components are mixed and sufficiently agitated and, after dissolution and dispersion, filtered under pressure with a micro filter (manufactured by Fujifilm Corporation) with a pore size of 1.0 m to prepare the ink.

Aforementioned yellow dispersion liquid 40 parts

Aforementioned resin fine particle dispersion liquid 10 parts 2-methyl-1,3-propanediol 15 parts 2-pyrrolidone 5 parts Acetylene glycol EO adduct 0.5 parts Deionized water (manufactured by Kawaken Fine Chemicals Co., Ltd.) balance As a characteristic of the inks used in the present embodiment, there is a point that each ink contains the "resin fine particles" to fix the ink on a non-permeable print medium. The "resin fine particles" means fine particles made of a resin and having such a particle size that the particles can be dispersed in an aqueous medium. The resin fine particles are particles that have such a function that the particles melt by being heated and form a film (film formation) on a surface of a print medium to fix the pigments onto the surface of the print medium.

In the present embodiment, the glass transition point Tg of the resin forming the resin fine particles is preferably higher than 30° C. and lower than 80° C. In the case when the glass transition point Tg is equal to or lower than 30° C., a difference between the glass transition point Tg of the resin and room temperature is small, and the resin fine particles are in a state close to a melting state also in the ink. Accordingly, the viscosity of the ink increases in the head, and quality (color developability, sharpness, and the like) of an image sometimes decreases due to ejection failure of the ink. In the case when the glass transition point Tg is equal to or higher than 80° C., a large amount of heat is necessary in a heating drying unit to melt the resin fine particles, and the resin fine particles cannot be melted before aggregation of pigment that occurs with evaporation of water in the ink. The quality (color developability and the like) of the image thus sometimes decreases.

The resin forming the resin fine particles is not limited to a particular resin as long as the glass transition point Tg thereof satisfies the aforementioned range. Specifically, examples of such resins include acryl resin, styrene-acryl resin, polyethylene resin, polypropylene resin, polyurethane resin, styrene-butadiene resin, fluoroolefin-based resin, and the like. For example, acryl resin can be synthesized by performing emulsion polymerization, or the like, on monomers such as (meth)acrylic acid alkyl ester and (meth)acrylic acid alkylamide. Moreover, styrene-acryl resin can be synthesized by performing emulsion polymerization or the like on a monomer of styrene and (meth)acrylic acid alkyl ester, (meth)acrylic acid alkylamide, or the like. An emulsion in which fine particles made of the aforementioned resin (resin fine particles) are dispersed in a medium can be obtained by the emulsion polymerization.

In the present embodiment, resin fine particles formed of any resin component that is insoluble to water and that is generally used can be also used as resin fine particles having a sulfonic acid group.

A resin component forming the resin fine particles is not limited to a particular resin component as long as it is a resin component including a sulfonic acid group, and any resin component such as any natural or synthesized polymer that is generally used or a polymer newly developed for the present embodiment can be used without limitation. Particularly, a copolymer or a polymer of a monomeric component having a radical polymerizable unsaturated bond into which acryl resin or styrene/acryl resin is categorized can be used from a viewpoint of ability of being generally used and simplicity of function design of the resin fine particles.

Generally, a surfactant is used as a penetrant to improve permeability of the ink into a print medium dedicated to inkjet. In the case of a non-permeable print medium, the surfactant is used to improve wettability. The greater the additive amount of the surfactant is, the stronger the property of reducing the surface tension of the ink is, and the more the wettability and the permeability of the ink into the print medium are improved. A surfactant acetylene glycol EO adduct or a fluorine or silicone based surfactant is preferably used. The fluorine or silicone based surfactant can reduce the surface tension of the ink even in the case when the content amount is small, and can thus improve the wettability of the ink on the print medium. This suppresses a phenomenon in which the ink is repelled on the surface of the print medium also in printing on a non-water-absorbing print medium, and the image quality can be further improved. In the present embodiment, the surface tensions of the respective inks are aligned to be 30 dyn/cm or less as a preferable surface tension. Fully-automatic surface tensiometer CBVP-Z (manufactured by Kyowa Interface Science Co., Ltd.) is used for the measurement of the surface tensions. Note that the measurement device is not limited to that exemplified above as long as the device can measure the surface tensions of the inks.

Moreover, since the inks of the present embodiment all use anionic color materials, pH of each ink is stable on the alkaline side, and the value thereof is about 8.5 to 9.5. Generally, pH of the ink is preferably 7.0 or more and 10.0 or less from the viewpoint of suppressing dissolution of an impurity from a member in contact with the ink, deterioration of a material forming the member, and a decrease in solubility of a pigment dispersion resin in the ink. For the measurement of pH, pH meter model F-52 manufactured by Horiba Ltd. is used. Note that the measurement device is not limited to that exemplified above as long as the device can measure the pH of the ink.

The viscosity of each of the prepared inks changes depending on the environmental temperature as described above. Although a main solvent of an ink used in the inkjet head is a solvent using water (referred to as aqueous ink hereinafter) in many cases from the viewpoint of safety, cost, and the like, the ink viscosity change due to the environmental temperature tends to be particularly large in this case.

Figure 19:
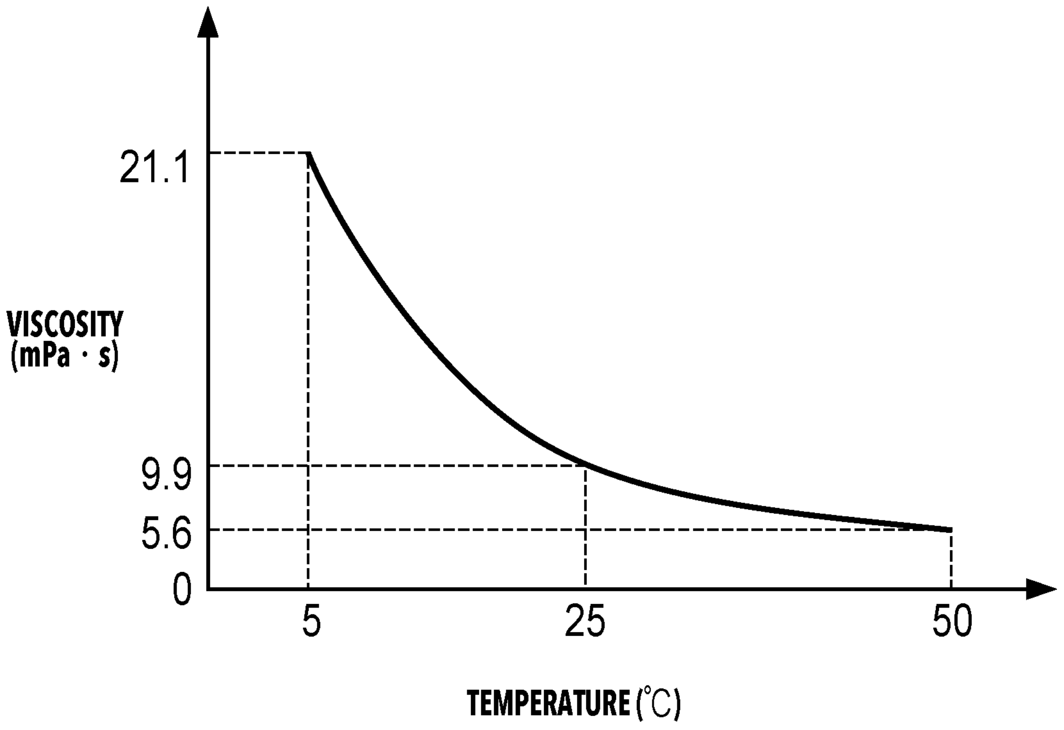
FIG. 19 is a diagram illustrating an example of a relationship between temperature and viscosity of an aqueous ink.

FIG. 19 is a diagram illustrating an example of a relationship between the temperature and the viscosity of an aqueous ink. For example, the ink viscosity is 21.1 mPa·s in the case when the ink temperature is 5° C. while the ink viscosity is 5.6 mPa·s in the case when the ink temperature is 50° C., and it is found that the higher the temperature is, the lower the ink viscosity is.

<Control Processing of Recovery Operation>

In the present embodiment, there is performed the processing in which the ink in the flow passages extending through the ejection ports 402 is circulated during the print operation and the recovery operation on the ejection port surface is executed after the completion of the print operation. A description is given of an example in which the wait time in the case when the recovery operation is to be executed on the ejection port surface after the completion of the print operation is controlled depending on the head temperature. This enables setting of suitable wait time before the recovery operation, and can reduce the wait time particularly in a high-temperature condition while suppressing an effect on a printed image.

In the present embodiment, the waiting time from the pump stop to the recovery operation is controlled depending on the head temperature obtained by the temperature sensors.

Figure 20:
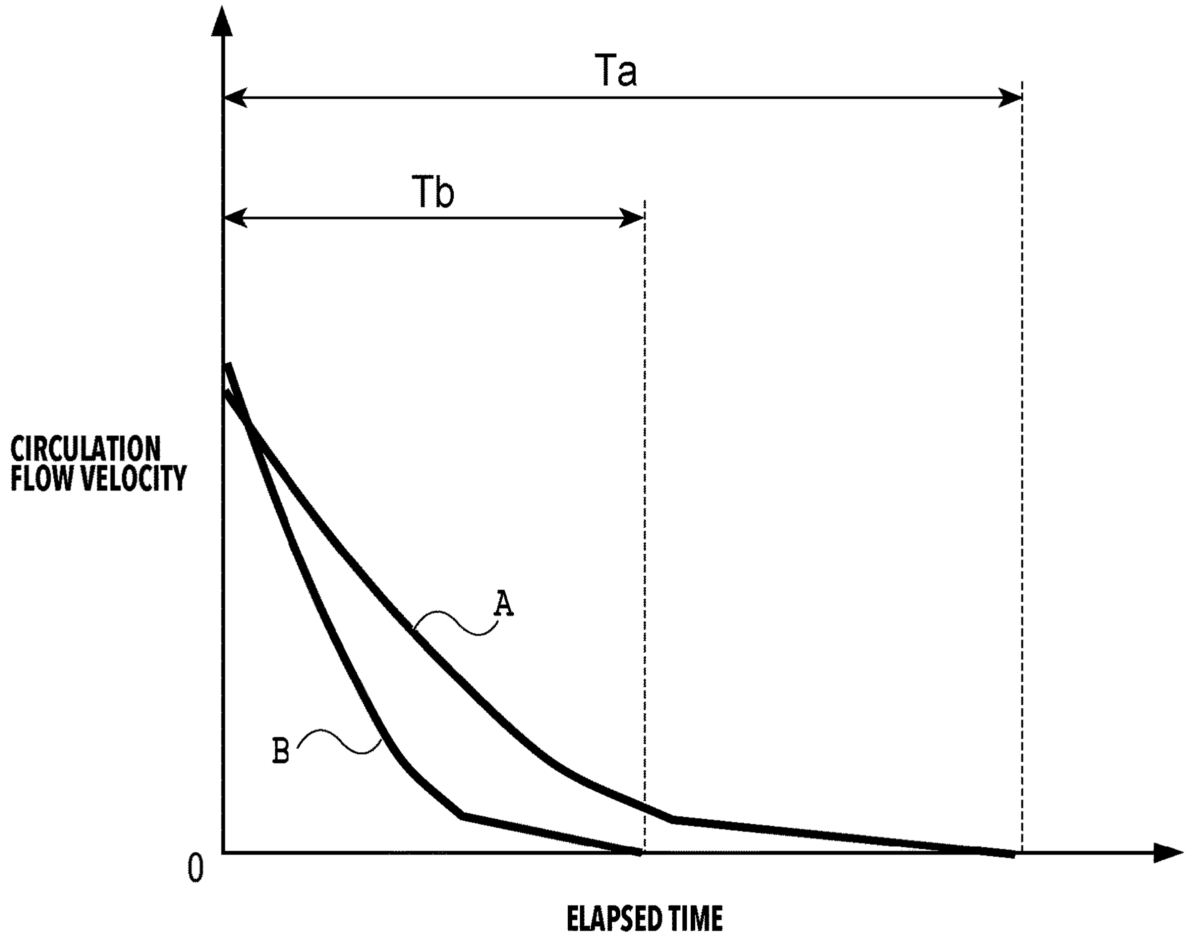
FIG. 20 is a diagram illustrating a change in the circulation flow velocity over time after stop of a circulation drive pump.

FIG. 20 is a diagram illustrating a change in the circulation flow velocity over time after the stop of the circulation drive pump 408 for two cases varying in head temperature. FIG. 20 illustrates examples of the cases using the same ink, and the examples vary only in head temperature. The horizontal axis of FIG. 20 represents the elapsed time from the stop of the circulation drive pump 408, and the vertical axis represents the circulation flow velocity. The curve A in FIG. 20 illustrates a flow velocity change in the case when the head temperature is relatively low (for example, 25° C.). The curve B illustrates a flow velocity change in the case when the head temperature is relatively high (for example, 50° C.). As illustrated in FIG. 19, the higher the temperature is, the lower the ink viscosity is. Accordingly, in comparison of the ink viscosities in the curve A and the curve B, the ink viscosity in the curve A is higher. According to FIG. 19, the viscosity of the curve A is 9.9 mPa·s, while the viscosity of the curve B is 5.6 mPa·s.

As illustrated in FIG. 20, time Ta (for example, thirty seconds) it takes for the circulation flow velocity of the curve A to stop is longer than time Tb (for example, fifteen seconds) it takes for the circulation flow velocity of the curve B to stop (Ta>Tb). This is due to the fact that an ink moving amount required for elimination of the pressure difference between the first pressure control member 406 and the second pressure control member 407 is determined depending on the pressure difference. In the curve A in which the head temperature is relatively low, the viscosity resistance of the ink is relatively high. Accordingly, relatively long time is required for a necessary amount of the ink to move from the first pressure control member 406 to the second pressure control member 407. Meanwhile, in the curve B in which the head temperature is relatively high, the viscosity resistance of the ink is relatively low, and the necessary amount of the ink moves from the first pressure control member 406 to the second pressure control member 407 in a relatively short time. As described above, the wait time from the stop of the circulation drive pump 408 to the stop of the circulation flow velocity can be controlled such that the higher the head temperature is, the shorter the wait time is, and the improvement in productivity from the case of low temperature can be expected.

Figure 21:
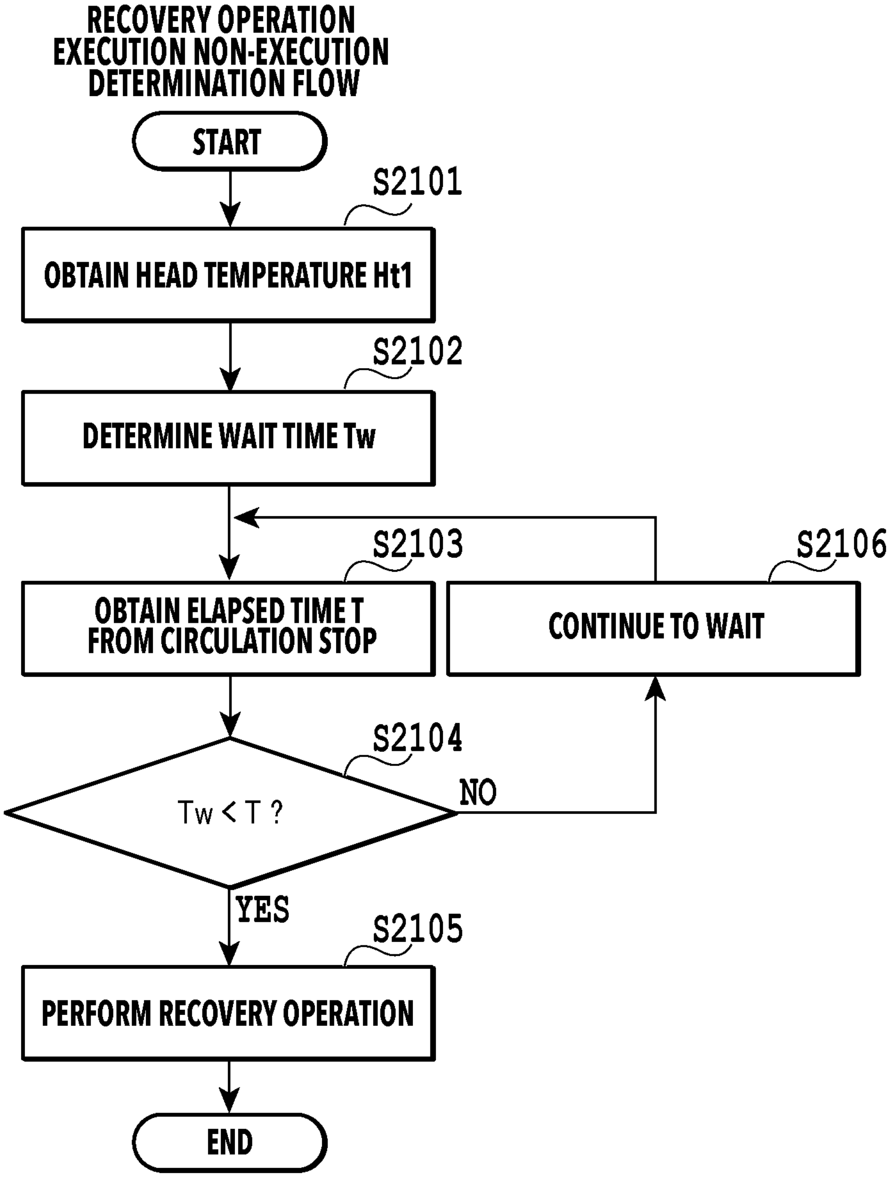
FIG. 21 is a diagram illustrating a flowchart of controlling wait time after the pump drive stop.

FIG. 21 is a diagram illustrating a flowchart of controlling the wait time after the pump drive stop depending on the head temperature. FIG. 22 is a diagram illustrating a table used to determine the wait time after the pump drive stop depending on the head temperature. A description is given below of processing of controlling the wait time after the stop of the circulation drive pump 408 with reference to FIGS. 21 and 22. Note that the processing illustrated in FIG. 21 is executed by the control performed by the print control unit 301 that is achieved by causing the CPU 302 to execute a program stored in the memory 303, or the like. Note that symbol "S" in description of each of processes means step in this flowchart (the same applies to other flowcharts described in the present specification). The processing of FIG. 21 starts from the moment at which the circulation drive pump 408 is stopped after the completion of the print operation.

In S2101, the print control unit 301 obtains head temperature Ht1 at the moment of the stop of the circulation drive pump 408. The lowest value among values obtained by the respective multiple temperature sensors arranged on the chips 403 of the print head 110 is preferably adopted as the head temperature Ht1. This is to determine the recovery processing execution timing matching a low-temperature ink that takes time for the flow velocity thereof to stop. However, the lowest value does not have to be necessarily adopted as the head temperature Ht1, and any value obtained by using the multiple temperature sensors may be adopted.

In S2102, the print control unit 301 determines the wait time Tw from the head temperature Ht1 obtained in S2101, based on the table illustrated in FIG. 22. In the table illustrated in FIG. 22, the wait time after the circulation pump stop depending on the head temperature and the wiping member is defined. The table illustrated in FIG. 22 is stored in, for example, the memory 303. In the table illustrated in FIG. 22, the wait time depending on the circulation configuration of the print head 110, the wiping member, and the head temperature is defined in advance. In the case when a recovery unit having multiple types of wiping members is to be used, the wait time may be varied depending on the member to be used for the wiping. For example, in the example of FIG. 22, in the case of a wiping member with high absorbability such as non-woven fabric, the amount of ink entering the ejection ports due to the wiping is less than that in the case of the wiper blade being the elastic member, and the wait time is thus set to be short.

In S2103, the print control unit 301 obtains the elapsed time T from the stop of the circulation drive pump 408. In S2104, the print control unit 301 determines whether the elapsed time T has exceeded the wait time Tw. In the case when the print control unit 301 determines that the wait time T has not exceeded the wait time Tw, the processing proceeds to S2106, and the print control unit 301 continues to wait. Then, the processing proceeds to S2103, and the print control unit 301 repeats the processing. In S2104, in the case when the print control unit 301 determines that the elapsed time T has exceeded the wait time Tw, the processing proceeds to S2105. In S2105, the print control unit 301 executes a predetermined recovery operation.

In the present embodiment, for example, as illustrated in FIG. 22, in the case when the wiping processing with the wiping blade is to be performed, the waiting time Tw is fifteen seconds if the head temperature Ht1 is 50° C. or above. Meanwhile, the waiting time Tw is thirty seconds if the head temperature Ht1 is below 25° C. Specifically, the wait time Tw in the case when the temperature obtained by the temperature sensors at the completion of the print operation by the print head is first temperature is shorter than the wait time in the case when the obtained temperature is second temperature lower than the first temperature.

Note that the predetermined wait time Tw only needs to be equal to or longer than the time it takes for the flow velocity near the ejection ports 402 in the print head 110 to stop, and does not have to be exactly the same as the wait time specified in the table. Moreover, although the wait time is determined with three levels of classes provided for the head temperature Ht1 in the example of FIG. 22, more levels of classes may be provided, or two levels classes may be provided.

Moreover, the wait time may be varied depending on the recovery processing. For example, in the case of the suction operation, the recovery processing is processing of sucking the ink from the ejection ports 402 by applying negative pressure to the interiors of the caps 211. Accordingly, the entrance of the color mixing ink and foreign substances deep into the circulation flow passage due to the wiping is less likely to occur as described above. Thus, in the case of the suction operation, the wait time may be set to zero seconds assuming that there is no effect of presence or absence of the circulation flow velocity.

As described above, according to the present embodiment, in the case when the ink is circulated via the flow passages in the ejection ports 402, the wait time from the stop of the circulation drive pump 408 to the recovery operation start is controlled depending on the temperature of the print head 110. This can suppress the mixing of the color mixing ink and foreign substances into the flow passages in the recovery operation while suppressing the decrease in productivity. As a result, it is possible to reduce the effect on the image and the ink ejecting performance. Particularly, in a condition in which the temperature of the print head is high, it is possible to reduce the time to the recovery operation start and to suppress the decrease in productivity.

Although description is given of the example in which the temperature of the ejection port surface of the print head is measured by using the temperature sensors arranged on the ejection port surface of the print head 110 and is used as the temperature of the print head 110 in the present embodiment, the temperature of the print head 110 is not limited to this example. Temperature measured by using a sensor that measures the ink temperature in the print head 110 may be treated as the temperature of the print head 110.

Fourth Embodiment

In the third embodiment, a description is given of the processing in which the temperature of the print head is measured in the state where the print operation is completed and the circulation drive pump 408 is stopped and the control depending on the temperature is performed. In the present embodiment, a description is given of an example in which the temperature of the print head 110 is adjusted in the state where the print operation is completed and the circulation drive pump 408 is stopped, and the recovery operation is executed in the state where the temperature is adjusted. Specifically, in the present embodiment, description is given of processing of adjusting the head temperature in the case when the ink in the flow passages extending via the ejection ports is circulated during the print operation and the recovery operation of the ejection port surface is executed after the completion of the print operation. In detail, control of increasing the head temperature is performed in the case where the head temperature is below predetermined temperature. This can reduce the ink viscosity. Accordingly, it is possible to reduce the wait time to the execution of the recovery operation in a low-temperature condition while suppressing the effect on the printed image. Note that, since the basic configuration is the same as that in the example described in the third embodiment, a description is given mainly of differences.

Figure 23:
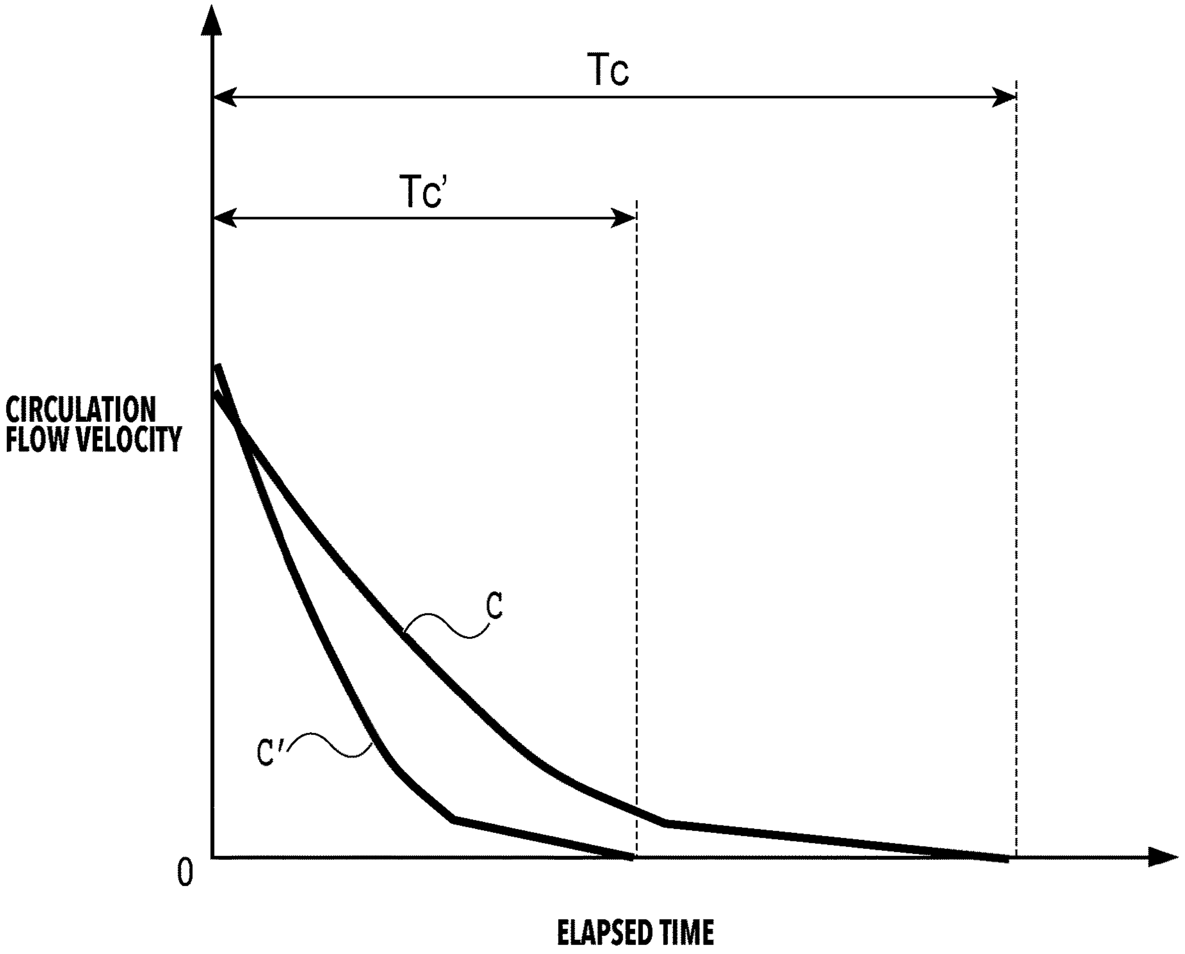
FIG. 23 is a diagram illustrating a change in the circulation flow velocity over time after the stop of the circulation drive pump.

FIG. 23 is a diagram illustrating a change in the circulation flow velocity over time after the stop of the circulation drive pump. The horizontal axis represents the elapsed time from the stop of the circulation drive pump. The vertical axis represents the circulation flow velocity. The curve C in FIG. 23 illustrates a flow velocity change in the case when the head temperature is low (for example, 20° C.). In the curve C, the wait time to the stop of the circulation flow velocity is Tc. Meanwhile, the curve C' illustrates a flow velocity change in the case when the temperature adjustment is executed (temperature adjustment target temperature: 60° C.) immediately after the stop of the circulation drive pump 408 for the same ink as that for the curve C. Note that the temperature adjustment processing is processing of adjusting the temperature until the temperature measured by the temperature sensors reaches a target temperature, by using one or both of the set of the temperature maintaining heaters 19 and 20 and the set of the heating elements 30. Moreover, in the case when the temperature reaches the target temperature, control of maintaining this temperature is performed. As described above, the higher the ink temperature is, the lower the ink viscosity is. Accordingly, in the case when the temperature adjustment is executed, time Tc' (for example, fifteen seconds) to the stop of the circulation flow velocity becomes shorter than Tc (for example, thirty seconds). Executing the temperature adjustment control depending on the head temperature as described above can reduce the wait time. As a result, the productivity can be improved also in a low-temperature condition.

Figure 24:
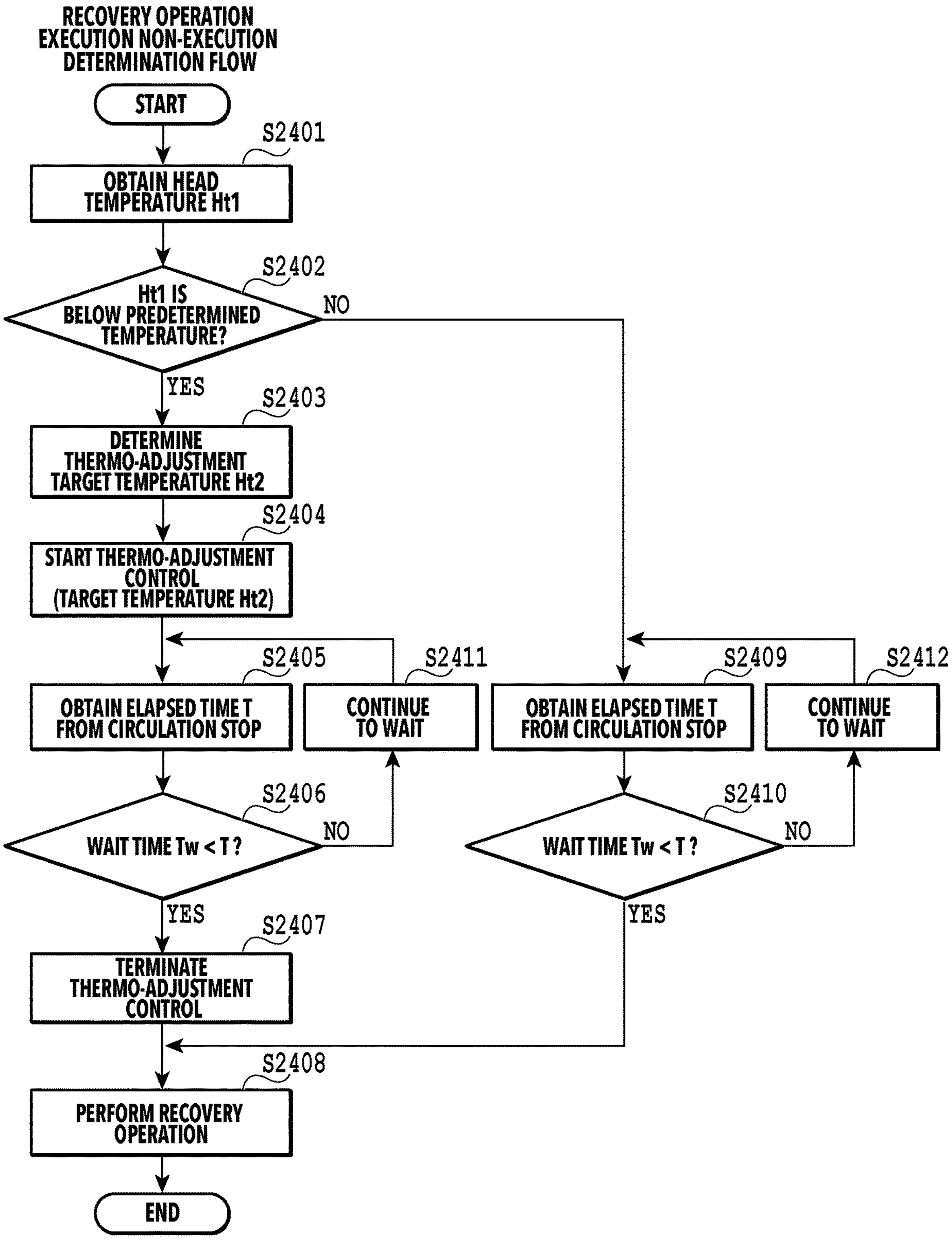
FIG. 24 is a diagram illustrating a flowchart of controlling the wait time after the pump drive stop.

FIG. 24 is a flowchart of controlling the wait time after the pump drive stop depending on the head temperature in the present embodiment. FIG. 25 is a diagram illustrating a table used to determine the thermo-adjustment target temperature after the pump drive stop depending on the head temperature. The processing of controlling the wait time after the stop of the circulation drive pump 408 is described below with reference to FIGS. 24 and 25. Note that the processing illustrated in FIG. 21 is also performed by the control by the print control unit 301. Moreover, the processing of FIG. 24 also starts at the moment of the stop of the circulation drive pump 408 after the completion of the print operation.

In S2401, the print control unit 301 obtains the head temperature Ht1. S2401 is the same process as S2101. In S2402, the print control unit 301 determines whether the head temperature Ht1 is lower than predetermined temperature. Then, control of whether to execute the temperature adjustment control is performed depending on a result of this determination. For example, in the case where the head temperature Ht1 is 50° C. or higher, the temperature is sufficiently high and the ink viscosity is low. Accordingly, no temperature adjustment control is performed. Specifically, in the present embodiment, a description is given assuming that the predetermined temperature is 50° C. In the case when the print control unit 301 determines that the head temperature Ht1 is lower than the predetermined temperature in S2402, the processing proceeds to S2403.

In S2403, the print control unit 301 determines thermo-adjustment target temperature Ht2 that is the target temperature of the temperature adjustment, from the head temperature Ht1 based on the table illustrated in FIG. 25. Then, in S2404, the print control unit 301 starts the temperature adjustment control by using the determined thermo-adjustment target temperature Ht2. Note that the thermo-adjustment target temperature is desirably varied depending on the head temperature. The higher the thermo-adjustment target temperature is, the lower the ink viscosity of the entire ink in the head is while the circulation flow velocity is present. Meanwhile, after the stop of the circulation flow velocity, the temperature adjustment control also promotes water evaporation from the ejection ports 402, and the thickening thus occurs only in the ink near the ejection ports. There is a possibility that the ink ejection in the next printing is hindered by this viscosity increase. Accordingly, the thermo-adjustment target temperature Ht2 is set to high temperature of 60° C. in the case when the head temperature Ht1 is low temperature of 25° C. or below, and is set to 50° C. in the case when the head temperature Ht1 is at or above 25° C. and below 50° C. Note that, although FIG. 25 illustrates the example in which the head temperature Ht1 is divided into two classes to set the thermo-adjustment target temperature Ht2, more levels of classes may be provided. Specifically, the thermo-adjustment target temperature Ht2 in the case when the head temperature Ht1 at the completion of the print operation by the print head is first temperature is set to be lower than the thermo-adjustment temperature in the case when the head temperature Ht1 is second temperature lower than the first temperature. Moreover, the thermo-adjustment target temperature Ht2 is not limited to the example illustrated in FIG. 25, but needs to be set not to exceed the glass transition point. This is to suppress ejection failure caused by solidification of the ink in the head.

Returning to FIG. 24, description of the processing continues. In S2405, the print control unit 301 obtains the elapsed time T from the circulation pump stop. Then, in S2406, the print control unit 301 determines whether the elapsed time T has exceeded the wait time Tw to the stop of the circulation flow velocity. Note that the wait time Tw is fixed in the present embodiment, and is assumed to be, for example, fifteen seconds that is the wait time in the case when the blade wiping is to be performed and the head temperature is 50° C. or above as illustrated in FIG. 22 of the third embodiment. Note that the wait time may be the wait time depending on the type of the wiping member as described in the third embodiment. However, in the processing of FIG. 24, since the head temperature is adjusted to the predetermined temperature or above by the temperature adjustment control, the fixed wait time Tw in the assumption of the predetermined temperature is used. In the case when the print control unit 301 determines that the elapsed time T has exceeded the wait time Tw to the stop of the circulation flow velocity in S2406, the processing proceeds to S2407, and the print control unit 301 terminates the temperature adjustment control. Then, the processing proceeds to S2408, and the print control unit 301 executes the recovery operation. Note that, in the case when the print control unit 301 determines that the elapsed time T has not exceeded the wait time Tw to the stop of the circulation flow velocity, the processing proceeds to S2411, and the print control unit 301 continues to wait. Then, the processing returns to S2405, and the print control unit 301 repeats the processing.

Next, a description is given of processing in the case when the head temperature is not below the predetermined temperature, that is at or above the predetermined temperature in S2402. As described above, in this case, no temperature adjustment control is executed. In the case when the print control unit 301 determines that the head temperature is not below the predetermined temperature in S2402, the processing proceeds to S2409. In S2409, the print control unit 301 obtains the elapsed time T from the circulation pump stop. Then, in S2410, the print control unit 301 determines whether the elapsed time T from the circulation pump stop has exceeded the wait time Tw to the stop of the circulation flow velocity. The wait time Tw may be the same as the wait time used in S2406. In the case when the print control unit 301 determines that the elapsed time T from the circulation pump stop has exceeded the wait time Tw to the stop of the circulation flow velocity, the print control unit 301 causes the processing to proceed to S2408 and transitions to the recovery operation in S2408. In the case when the print control unit 301 determines that the elapsed time T from the circulation pump stop has not exceeded the wait time Tw to the stop of the circulation flow velocity in S2409, the print control unit 301 causes the processing to proceed to S2412, continues to wait, cause the processing to return to S2409, and repeats the processing.

Modified Example

A description is given of the example in which the wait time Tw is fixed in the processing of FIG. 24. As a modified example, a description is given of an example in which the wait time Tw can be further controlled depending on the head temperature Ht1. This is because, in the case when the head temperature is extremely low and the circulation flow velocity does not stop within the predetermined wait time Tw even if the temperature adjustment control is executed, it is preferable to set the wait time Tw to even longer time.

Figure 26:
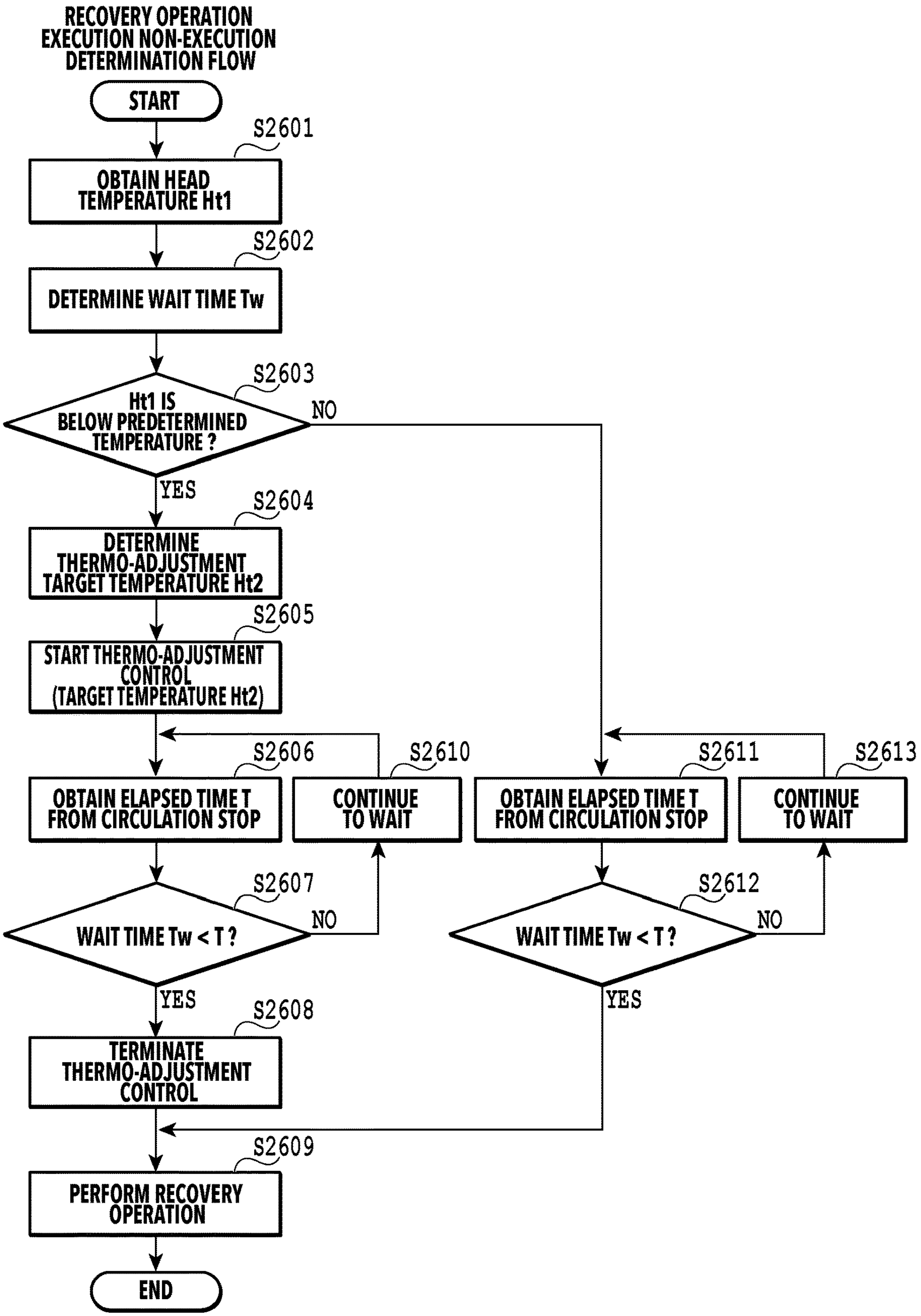
FIG. 26 is a diagram illustrating a flowchart of controlling the wait time after the pump drive stop.

FIG. 26 is a diagram illustrating a flowchart of controlling the wait time after the pump drive stop depending on the head temperature in the present modified example. FIG. 27 is a diagram illustrating a table used to determine the thermo-adjustment target temperature after the pump drive stop depending on the head temperature. A description is given below of processing of controlling the wait time after the stop of the circulation drive pump 408 with reference to FIGS. 26 and 27. Note that the processing illustrated in FIG. 26 is also performed by the control by the print control unit 301. Moreover, the processing of FIG. 26 also starts from the moment of the stop of the circulation drive pump 408 after the completion of the print operation.

In the flowchart of FIG. 26, immediately after the obtaining of the head temperature Ht1 in S2601, in S2602, the print control unit 301 determines the wait time Tw based on the table in FIG. 27. The following processes are the same as the processes described in FIG. 24. Specifically, the processes from S2603 to S2613 are the same as the processes from S2402 to S2412, respectively. However, the wait time Tw is the wait time determined in S2602.

In FIG. 27, the wait time Tw depending on the head temperature and the thermo-adjustment target temperature is set. Moreover, FIG. 27 illustrates an example in which, in the case when a recovery unit having multiple wiping members are to be used, the wait time is varied depending on the member to be used for the wiping as in the example described in the third embodiment.

In the present embodiment, for example, in the case when blade wiping is to be executed, the thermo-adjustment target temperature Ht2 is set to 60° C. and the wait time Tw is set to fifteen seconds if the head temperature Ht1 is 10° C. or above and below 25° C. Meanwhile, if the head temperature Ht1 is below 10° C., the thermo-adjustment target temperature Ht2 is set to 60° C. and the wait time Tw is set to twenty-five seconds. Note that, as in the example described in the third embodiment, the wait time T only needs to be equal to or longer than the time it takes for the flow velocity near the ejection ports in the print head to stop, and does not have to be the same time as the example illustrated in FIG. 27. Moreover, in the example of FIG. 27, the wait time is determined with the three levels of classes provided for the head temperature as in the example of the third embodiment. However, more levels of classes may be provided, or two levels of classes may be provided. Furthermore, as in the example described in the third embodiment, the wait time may be varied depending on the recovery processing.

As described above, in the present embodiment, in the case when the ink is circulated via the flow passages in the ejection ports 402, the circulation drive pump 408 is stopped, and then the temperature adjustment is performed such that the temperature of the print head 110 reaches or exceeds the predetermined temperature. This can reduce the wait time from the stop of the circulation drive pump 408.

Fifth Embodiment

In the present embodiment, a description is given of an example in which the preliminary ejection executed to correspond to the wiping operation on the ejection port surface of the print head is adequately and efficiently performed. Since the basic configuration is the same as that in the example described in the first embodiment, a description is given mainly of differences and the like.

Figure 28A:
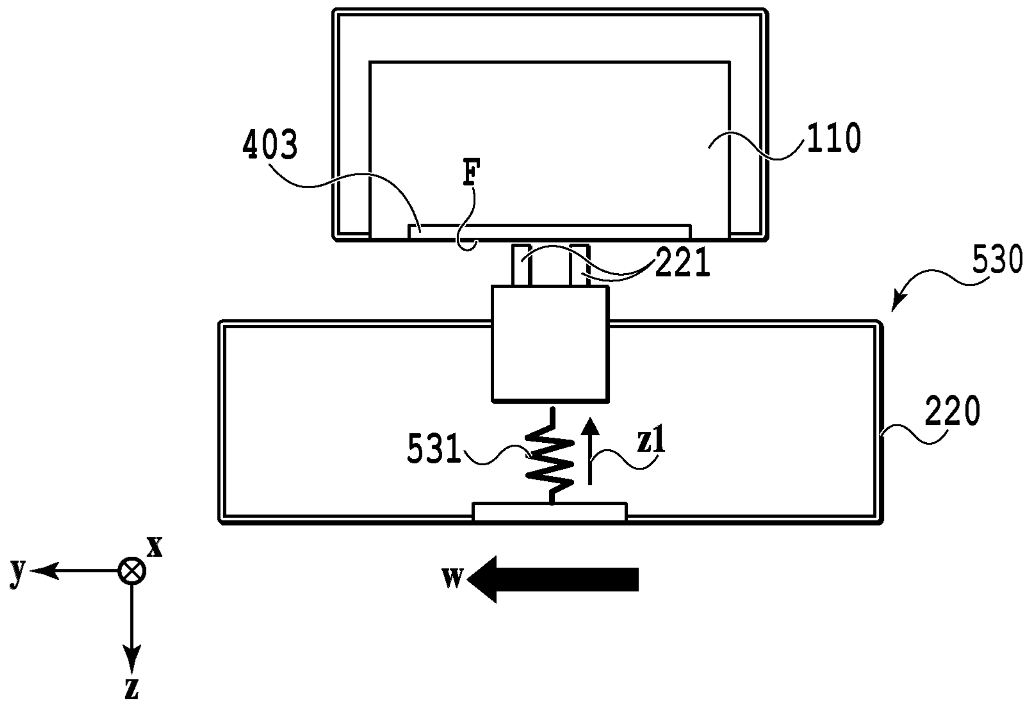
FIGS. 28A and 28B are cross-sectional schematic diagrams illustrating a wiping mechanism.
Figure 28B:
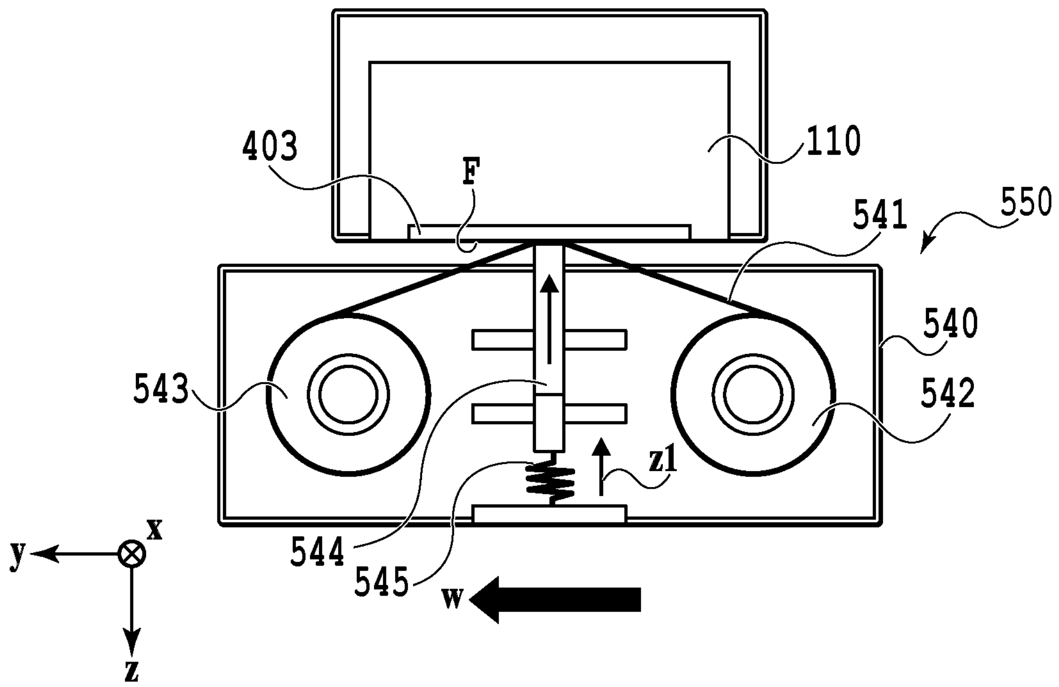

A description is given of operations and an internal structure of each of a wiping mechanism in which wipers 221 are formed of elastic members and a wiping mechanism in which a wiper 221 is formed of a porous member, with reference to FIGS. 28A and 28B.

FIG. 28A is a cross-sectional schematic diagram illustrating an example of a wiping mechanism (wiping unit) 530 including the wipers 221 formed of rubber elastic members. The wiping mechanism illustrated herein corresponds to the wiping mechanism provided in the recovery unit 210 in FIG. 4. The wiping mechanism 530 illustrated in FIG. 28A includes the wiper holder 220 movable in a w direction and the wipers 221 held on the wiper holder 220. The wipers 221 are formed of rubber elastic members, and are supported elastically in a z1 direction by a spring 531 provided in the wiper holder 220. The wipers 221 are brought into contact with the ejection port surface F of the print head 110 located at a home position, and are moved in the w direction (wiping direction) together with the wiper holder 220. The entire ejection port surface F of the print head 110 is thereby wiped. In this case, the wipers 221 perform the wiping operation without absorbing the inks attached to the ejection port surface F. Accordingly, in the case when a great amount of inks are attached to the ejection port surface F, there is a possibility that the inks of other colors enter the flow passages from the ejection ports 402 during the wiping of the inks and are mixed in the flow passages, and color mixing occurs in the print head 110. Accordingly, after the execution of the wiping operation by the wipers 221, there is performed the preliminary ejection (also referred to as purge) to discharge the color mixing ink from the ejection ports 402 and the flow passages.

Moreover, FIG. 28B is a cross-sectional schematic diagram illustrating an example of a wiping mechanism 550 in which a wiper (wiping member) that wipes the ejection port surface F is formed of a porous member (in this example, non-woven fabric). In the wiping mechanism 550 illustrated herein, a band-shaped sheet-like member 541 forming the wiper, a feed roller 542 that feeds the sheet-like member 541, a rewinding roller 543 that collects the sheet-like member 541, a pressing member 544, a pressing spring 545, and the like, are housed in a wiper holder 540. The sheet-like member 541 is wound around the feed roller 542, and the sheet supplied from the feed roller 542 is rewound on the rewinding roller 543. The sheet-like member 541 is used while being impregnated with an impregnating solution in advance. A liquid including water, surfactant, solvent, and the like, is used as the impregnating solution. More specifically, an impregnating solution containing solvent with low volatility such as polyethylene glycol as a main component is used. Moreover, the pressing spring 545 causes the pressing member 544 to press a portion of the sheet-like member 541 from the feed roller 542 to the rewinding roller 543 upward from below. Contact pressure of the sheet-like member can be thereby changed depending on a region of the ejection port surface F to be wiped by the sheet-like member 541.

In the wiping mechanism 550 illustrated in FIG. 28B, the wiper holder 540 is moved in the w direction while the pressing member 544 presses the sheet-like member 541 against the ejection port surface F of the print head 110. The sheet-like member 541 thereby wipes the ejection port surface F as the wiper. In the case when a non-woven fabric is used as the wiper, the inks infiltrate the wiper. Accordingly, the wiper performs the wiping operation while absorbing the inks on the ejection port surface F. Thus, it is possible to suppress entrance of the inks into the ejection ports 402 and to suppress occurrence of the color mixing of the inks in the ejection ports and the flow passages. However, the sheet-like member 541 after the wiping operation is in a state where the absorbability of the inks has decreased and the inks are attached to the surface. Accordingly, the feed roller 542 and the rewinding roller 543, forming a sheet moving unit, are rotated as appropriate to move the sheet-like member 541 in a longitudinal direction, and the wiping operation is performed with excellent ink absorbability and wiping performance maintained. This moving of the sheet-like member 541 may be performed every time the wiping operation is completed or performed while the wiping operation is performed, and the moving control of the sheet-like member 541 can be changed as necessary.

Although the example in which the ejection port surface F is wiped only in the case when the wipers 221 and 541 are moved in a forward direction (w direction) is described in the present embodiment, the configuration is not limited to this. The ejection port surface F may be wiped in both of movement of the wipers 221 and 541 in the forward direction (w direction) and movement in a return direction. Moreover, although the wiping direction is the arranging direction (y direction) of the ejection ports 402 in the print head 110 in the present embodiment, the configuration may be such that the wipers 221 are moved in a direction (x direction) intersecting (orthogonal to) the y direction. Moreover, the configuration may be such that the wipers 221 are fixed, and the carriage unit 102 is moved in the main scanning direction (x direction) to wipe the ejection port surface F. Furthermore, the configuration may be such that wiping is performed in various directions by using multiple wipers 221. In this case, recovery units may be arranged at different positions, respectively. For example, the configuration may be such that one recovery unit is arranged near the standby position of the carriage unit 102, and another recovery unit is arranged on the opposite side of the print region for printing on the print medium. Moreover, a vacuum wiper capable of sucking the wiped inks by using negative pressure may also be used.

<Purge Ejection after Wiping Operation>

Purge ejection performed after the wiping operation is described. In the printing apparatus 101 of the inkjet method, there is a possibility that ink mist, and the like, generated in the ink ejection attach to the ejection port surface F of the print head 110, and to reduce the ejection performance of the print head. Accordingly, removal of the inks attached to the ejection port surface F is necessary, and the wipers 221 perform the wiping operation of wiping the ejection port surface F. However, in the wiping operation, there is a possibility that the inks attached to the ejection port surface F are spread and pushed into the ejection ports 402, and reduce the ejection performance and the image quality. Particularly, in the case when the inks pushed into the ejection ports 402 are inks of colors different from the ink to be ejected from the ejection ports 402, color mixing occurs in the print head 110. Accordingly, ejection of inks that do not contribute to the print operation, that is the purge ejection is generally performed from the ejection ports 402 after the wiping operation, and unsuitable inks having entered from the ejection ports 402 due to the wiping are discharged.

In a configuration in which the printing apparatus executes no ink circulation, the inks having entered the ejection ports 402 stay near the ejection ports 402. Accordingly, the discharging of the unsuitable inks such as the color mixing ink can be completed by performing ejection of a small amount in the purge operation. However, the present embodiment adopts the configuration in which the inks are circulated in the print head 110 to suppress the thickening, solidification, and the like, of the inks and maintain excellent ejection performance. Accordingly, in the printing apparatus 101 of the present embodiment, the inks having entered the ejection ports 402 that are the unsuitable inks such as the color mixing ink immediately flow deep into the flow passages due to ink flows in the flow passages communicating with the ejection ports 402. Accordingly, in order to discharge the unsuitable inks by the purge operation, ejection needs to be performed many times in the purge operation.

In the present embodiment, as illustrated in FIG. 8, in order to avoid the decrease in productivity, the wiping operation is performed in the state where the circulation flow velocity remains, and the color mixing is eliminated by the purge operation. In this case, the time and ink ejection amount required for the recovery of the ejection performance by the purge operation vary greatly depending on the amount of the color mixing ink, the circulation flow velocity, time from the wiping start to the purge operation, and the like. In the present embodiment, a description is given assuming the case when the time from the wiping to the purge operation is short and high productivity can be obtained, as an example.

A description is given of the circulation flow velocity of each ink in the print head 110. The circulation flow velocity in the print head 110 is expressed by a flow rate of the ink per unit of time. The higher the circulation flow velocity at the completion of the print operation, that is at the circulation drive stop is, the more quickly the pressure difference between the first pressure control member 406 and the second pressure control member 407 after the circulation drive stop (here after, simply referred to as pressure difference) is eliminated. Accordingly, the higher the circulation flow velocity at the circulation drive stop is, the lesser the pressure difference at the wiping start is, and the lower the circulation flow velocity at the wiping start is. Thus, the amount of the color mixing ink entering deep into the flow passages is low. Hence, in the case when the print operation is performed under a condition in which the pressure difference is less likely to be eliminated after the print operation completion, the color mixing can be efficiently eliminated by increasing the number of times of ejection in the purge operation performed after the wiping.

As described above, the higher the circulation flow velocity in the case when the circulation drive is stopped in response to the completion of the print operation is, the more quickly the pressure difference after the circulation drive stop is eliminated. Provided that the drive conditions of the circulation drive pump 408 are the same, the lower the viscosity of the ink is, the higher the circulation flow velocity is, and the higher the temperature of the ink is, the lower the viscosity of the ink is. Specifically, the higher the temperature of the print head 110 is, the higher the temperature of the circulated ink is, and the more quickly the pressure difference after the circulation drive stop is eliminated. Accordingly, the higher the temperature of the print head 110 is, the lower the circulation flow velocity at the wiping start is, and the lesser the amount of the color mixing ink entering deep into the flow passages is.

Accordingly, in the present embodiment, the temperature sensors mounted in the print head 110 detect the temperature of the ink, and the following control is performed. In the case when the detected temperature is high, the number of times of ejection in the purge operation is set relatively low. In the case when the detected temperature is low, the number of times of ejection in the purge operation is set relatively great. An adequate purge operation that is not insufficient or excessive can be thereby performed. Specifically, it is possible to surely discharge the unsuitable inks such as the color mixing ink present in the ejection ports and the flow passages due to the wiping while suppressing excessive discharging of the inks.

Purge Operation Control Using Present Embodiment

Figure 29:
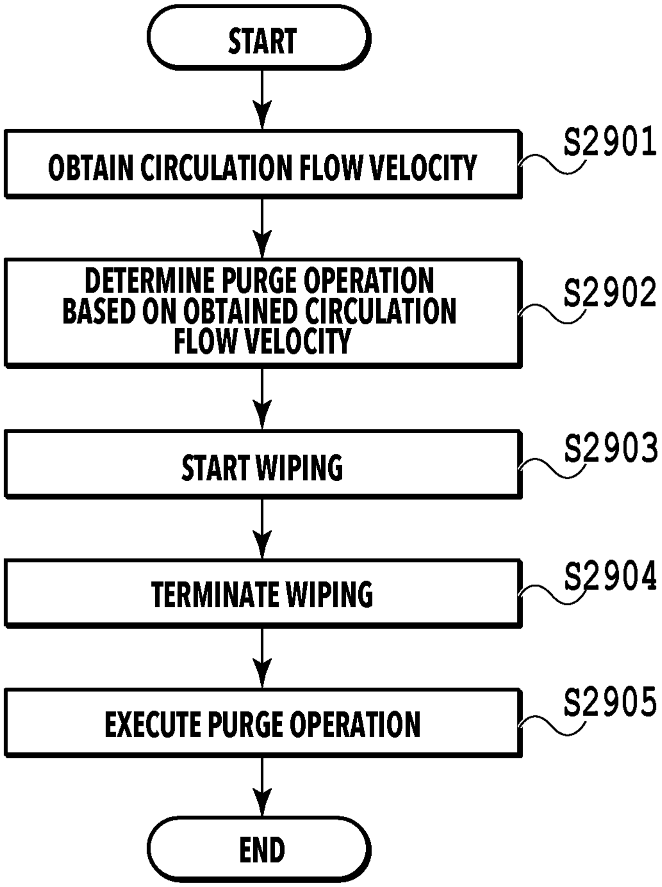
FIG. 29 is a flowchart illustrating purge operation control.

Purge operation control executed in the present embodiment is described based on the flowchart of FIG. 29. Note that the processes in the flowchart of FIG. 29 are assumed to be executed by the CPU 302. Moreover, "S" attached to each of step numbers in the flowchart of FIG. 29 and the flowchart of FIG. 30 to be described later means step.

The CPU 302 performs processing as an obtaining unit that obtains the circulation flow velocity of the ink at the wiping start (S2901). The circulation flow velocity of the ink is obtained by using wiping start time (first elapsed time) from the time point of the circulation drive stop to the wiping start and circulation flow velocity remaining time (second elapsed time) that is time from the circulation drive stop to the stop of the ink flow. Note that the circulation flow velocity remaining time is derived based on the ink temperature detected by the temperature sensors. Specifically, the circulation flow velocity remaining time is short in the case when the detected ink temperature is high, and is long in the case when the detected ink temperature is low. In the case where the wiping start time from the time point of the ink circulation drive stop to the wiping start is longer than the circulation flow velocity remaining time determined based on the ink temperature, the flow velocity of the ink at the wiping start is zero. Meanwhile, in the case when the circulation flow velocity remaining time is longer than the wiping start time, the ink is flowing at the wiping start.

Next, in S2902, the CPU 302 determines the purge operation to be executed, based on the obtained circulation flow velocity (S2902). Specifically, in the case when the obtained circulation flow velocity of the ink at the wiping start is zero, the CPU 302 sets a purge operation with a standard number of times of ejection. Meanwhile, in the case when the obtained circulation flow velocity is not zero, the CPU 302 sets a purge operation with an ejection amount depending on the obtained circulation flow velocity. Specifically, in the case when the circulation flow velocity of the ink at the wiping start is relatively high, the CPU 302 sets a purge operation in which a decree of recovery of the ejection performance is relatively high. In the case when the circulation flow velocity is relatively low, the CPU 302 sets a purge operation in which the degree of recovery of the ejection performance is relatively low. The degree of recovery of the ejection performance is defined by the number of times of ejection, ejection rate (ejection frequency), and the like in the purge ejection operation.

Thereafter, the CPU 302 starts the wiping (S2903) and, after predetermined wiping is performed, terminates the wiping (S2904). In the case when the wiping is completed, the CPU 302 executes the purge operation determined in S2902.

Although the circulation flow velocity at the wiping start is calculated in S2901 of FIG. 29 by using the wiping start time and the circulation flow velocity remaining time in the present embodiment, the method of obtaining the circulation flow velocity at the wiping start is not limited to this. For example, it is possible employ a method of directly measuring the circulation flow velocity at the wiping start by using a flow meter, a method of measuring the pressure difference between the liquid chambers with a pressure meter and obtaining the circulation flow velocity at the wiping start based on the measured pressure, and the like.

As described above, in the present embodiment, the level of entrance of the color mixing ink, and the like, into the flow passages is estimated from the circulation flow velocity, and the purge operation with the number of times of ejection according to the estimation is performed. This suppresses increases in waste ink amount and purge time due to an excessive purge operation while achieving maintaining of an adequate ejection performance. Meanwhile, a conventional purge operation after the wiping is performed in consideration of the most severe level of color mixing that may occur due the wiping. This effectiveness of the present embodiment is specifically described below in a comparison with a comparative example in which the conventional purge operation is performed.

First, the wiping operation and a situation of occurrence of color mixing after the wiping are described. Note that the wiping operation is performed under the same conditions in both of the present embodiment and the comparative example.

First, time (hereafter referred to as wiper contact time) from the ink circulation drive stop (drive stop of the circulation drive pump 408) in the print head 110 to the contact of the wiper with the ejection port surface to perform wiping is measured. As a result, the wiper contact time is ten to fifteen seconds. Note that, in the present example, it is assumed that an elastic resin wiper is used, and the wiping starts at the moment at which the wiper contact time elapses.

Moreover, time (circulation flow velocity remaining time) from the circulation drive stop to the actual stop of the ink flow is measured under a temperature condition in which the ink temperature is 25° C. As a result, it is confirmed that the circulation stop time is about twenty seconds.

As a result of the execution of wiping under the aforementioned conditions, color mixing occurs in the flow passages of the print head 110. This is due to the fact that the wiper contact time is shorter than the circulation stop time and the ink is flowing at the wiping start as described above.

After the aforementioned wiping operation, the purge operation is performed under the following conditions, and the level of color mixing occurring in the print head 110 is checked. First, the ejection frequency in the purge operation is set to 10 kHz, and the number of times of ejection is set to one hundred thousand. This condition of purge operation is hereafter referred to as purge operation condition [1]. As a result of executing the purge operation under the purge operation condition [1], the color mixing disappeared from the inks ejected from the print head 110, and elimination of the color mixing that has occurred in the print head 110 is confirmed.

Meanwhile, in the case when the purge operation is performed under a purge operation condition in which the ejection frequency is 1 kHz and the number of times of ejection is 1000 (hereafter, referred to as purge operation condition [2]), no elimination of the color mixing is confirmed. This is due to the fact that the discharge speed and discharge amount of the inks by the purge operation in the purge operation condition [2] are less than those in the purge operation condition [1]. However, in the case when where the wiping contact time is set to thirty seconds, the elimination of the color mixing is possible also in the purge operation condition [2]. This is due to the fact that the flow velocity of the ink at the wiping start becomes lower due to delaying of the wiping start timing, and the level of occurrence of color mixing becomes lower. As described above, it is found that, at a low level of occurrence of color mixing due to the wiping operation, the color mixing can be eliminated even in the case when the ejection frequency and the number of times of ejection are reduced as the purge operation condition.

In the case when the aforementioned purge operation conditions and color mixing elimination states are taken into consideration, the purge operation is always executed under the purge operation condition [1] in the comparative example, in regard to a situation where the maximum level of color mixing occurs. Meanwhile, in the present embodiment, in S2902 of FIG. 29, the CPU 302 estimates the level of the occurrence of the color mixing from the circulation flow velocity at the wiping start, and determines the purge operation condition of the number of times of ejection according to the estimation. Specifically, in the case when the circulation flow velocity at the wiping start is high and the level of color mixing is significant, the purge operation of the purge operation condition [1] is executed. In the case when the circulation flow velocity at the wiping start is low and the level of color mixing is minor, the purge operation of the purge operation condition [2] is executed.

Accordingly, in the present embodiment, it is possible to reduce the waste ink amount and the wiping time from those in the comparative example in which the purge operation of the purge operation condition [1] is always executed, in regard to occurrence of the maximum level of color mixing, and reduction of the running cost and an improvement in productivity can be achieved. Specifically, an increase in efficiency of the purge operation can be achieved.

Moreover, as described above, the time (circulation flow velocity remaining time) from the circulation drive stop to the actual stop of the ink flow varies depending on the temperature at the wiping start, and the circulation flow velocity at the wiping start also varies depending on the circulation flow velocity remaining time. For example, in the case when the temperature of the ink is 60° C., the circulation flow velocity remaining time is about fifteen seconds. Specifically, the circulation flow velocity remaining time is shorter than that in the case where the temperature of the ink is 25° C., and the circulation flow velocity at the wiping start also decreases with this. In this case, the color mixing of the inks in the print head 110 can be eliminated under both of the purge operation conditions [1] and [2] described above. Accordingly, in the present embodiment, there is executed the purge operation of the purge operation condition [2] in which the ink discharge amount is low and the wiping time is short. Since the purge operation is determined in consideration of the ink temperature as described above in the present embodiment, a more adequate and efficient purge operation can be executed.

Although the example in which the purge operation condition is determined in consideration of the temperature detected by the temperature sensors provided in the print head 110 is described in the present embodiment, the purge operation may be determined by further taking the environmental temperature around the printing apparatus 101 into consideration. For example, in comparison of the case when the environmental temperature is 10° C. and the case when the environmental temperature is 30° C., a difference in the circulation flow velocity remaining time may occur. Specifically, in the case when the environmental temperature is 10° C., a decrease in ink temperature is more likely to occur, and the circulation flow velocity remaining time tends to be longer than that in the case when the environmental temperature is 30° C. Accordingly, a more adequate purge operation can be executed by obtaining the environmental temperature together with the temperature of the ink and determining the circulation flow velocity remaining time based on a difference between the two temperatures, and the effectiveness of the printing apparatus is further improved.

Sixth Embodiment

Next, the sixth embodiment of the present disclosure is described. In the present embodiment, a description is given of suitable purge operation control in the case when the wiping mechanism 550 including the wiper of the porous member (non-woven fabric) illustrated in FIG. 28B executes the wiping.

As described above, the wiping mechanism 550 illustrated in FIG. 28B includes the sheet-like member 541 that can wipe off the inks attached to the ejection port surface of the print head, as the wiper. Since the porous member, such as non-woven fabric, is more likely to absorb the inks from the ejection ports in the wiping than the elastic member, a higher wiping effect can be obtained. In the present embodiment, the length of the sheet-like member 541 brought into contact with the ejection port surface F by the pressing member is about five mm in the ejection port array direction (that is, the wiping direction).

<Relationship Between Wiping and Purge Operation Control>

In the present embodiment, a description is given of purge operation control that is more suitable in the case when the amount of color mixing ink generated in the print head is large. As described above, in the case when the ink temperature is low, the circulation flow velocity remaining time is long. However, if the wait time to the wiping start is provided, the recovery operation from the wiping to the completion of the purge operation requires a lot of time. Accordingly, in order to make the time required for the recovery operation substantially the same as that in the occurrence of the normal color mixing also in a situation where the amount of color mixing ink generated in the print head 110 is expected to be great, it is necessary to suppress the level of color mixing and execute the purge operation immediately after the color mixing.

In the fifth embodiment, the number of times of ejection and the ejection frequency in the purge operation executed after the completion of the wiping are controlled. Meanwhile, in the present embodiment, control of advancing the start timing of the purge operation is performed to suppress entrance of the color mixing ink deep into the flow passages due to the circulation flow and reduce the purge operation time and the discharge amount of the ink in the purge operation.

Specifically, the purge operation on the sheet-like member 541 is performed while the sheet-like member 541 performs the wiping. In other words, the color mixing ink and the like having entered from the ejection port due to the wiping are immediately discharged to the sheet-like member 541, and the color mixing is thereby instantaneously eliminated. This allows the color mixing ink, and the like, to be discharged before entering deep into the flow passages, and troubles such as color mixing can be eliminated with a fewer ejection amount.

For example, in the case when the wiping is executed at speed of 100 mm/s, time for which the sheet-like member 541 is in contact with the ejection port surface F in the wiping is about 0.3 seconds. Accordingly, in the present embodiment, the purge ejection is executed on the sheet-like member 541 for 0.3 seconds from the moment when the sheet-like member 541 comes into contact with the ejection port surface F. The color mixing ink having entered the ejection ports due to the wiping can be thereby immediately discharged to the sheet-like member 541, and the adequate ejection performance can be maintained with the ejection amount due to the purge operation reduced.

Figure 30:
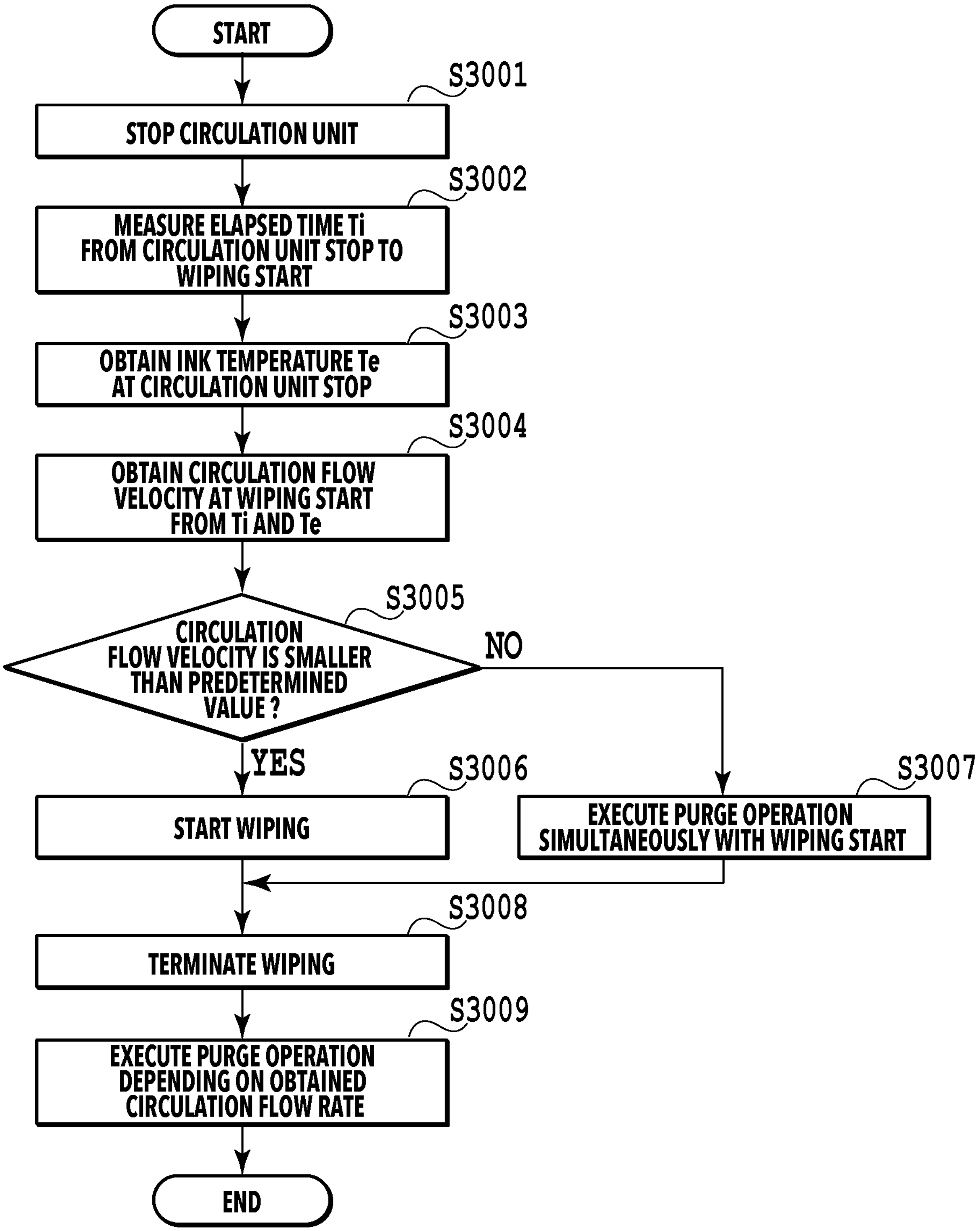
FIG. 30 is a flowchart illustrating the purge operation control.

The aforementioned operation is described according to the flowchart of FIG. 30. Note that each of processes in the flowchart of FIG. 30 is executed by the CPU 302 illustrated in FIG. 2.

In S3001, the CPU 302 stops the drive of the circulating drive pump 408 that is the circulation unit, and then obtains the wiping start time T1 that is the elapsed time from the circulation drive stop to the wiping operation start (S3002). Moreover, the CPU 302 obtains the temperature Te detected by the temperature sensors (S3003). Thereafter, the CPU 302 obtains the circulation flow velocity at the wiping start based on the obtained wiping start time T1 and the ink temperature Te (S3004). Then, the CPU 302 determines whether a difference between the circulation flow velocity remaining time and the wiping start time (circulation flow velocity remaining time-wiping start time) is shorter than predetermined time (20 seconds in the present embodiment) (S3005). Note that the greater the difference between the circulation flow velocity remaining time and the wiping start time is, the higher the circulation flow velocity at the wiping start is, and the lesser the difference is, the lower the circulation flow velocity is. In the case when the difference is zero or less, the circulation flow velocity is zero. In the case when the CPU 302 determines that the difference between the circulation flow velocity remaining time and the wiping start time is equal to or longer than the predetermined time in the determination of S3005, the CPU 302 advances the start timing of ejection in the purge operation such that the inks are ejected onto the sheet-like member 541 (S3007). Specifically, the purge operation is executed simultaneously with the wiping start. The color mixing ink generated due to the wiping are thereby immediately discharged to the sheet-like member 541, and the color mixing can be eliminated with a small ejection amount.

Meanwhile, in the case when the CPU 302 determines that the difference between the circulation flow velocity remaining time and the wiping start time is shorter than the predetermined time in S3005, the CPU 302 starts the wiping operation in S3006. Thereafter, in the case when the wiping operation is completed in S3008, the CPU 302 executes the purge operation depending on the circulation flow velocity obtained in S3004 described above (S3009). Specifically, the higher the obtained circulation flow velocity is, the greater the ink discharged amount is in the executed purge operation.

Other Embodiments

In each of the embodiments described above, a description is given of a form using the so-called serial print head in which the print head 110 is mounted in the carriage unit 102 and the inks are ejected from the print head 110 according to reciprocal scanning of the carriage. However, there may be used a so-called in-line print head in which the ejection ports of the print head are provided over the length of the print medium in the width direction. In the case when the in-line print head is used, an image may be printed on the print medium by ejecting the inks onto the print medium without the reciprocal scanning of the print head. The remaining time of the print operation can be calculated in S1001 of FIG. 10 also in the case when the in-line print head is used. For example, the remaining time of the print operation can be calculated from the unprinted region of the image data and the conveyance speed of the print medium.

Moreover, although description is given by using the form in which the circulation drive pump 408 is included in the print head 110 as an example in each of the aforementioned embodiments, a form in which the circulation drive pump is provided outside the print head, that is on the main body side may be employed. The aforementioned embodiments are effective in any form in the case where predetermined time is required for the circulation in the circulation flow passage to stop from the stop of the drive of the circulation drive pump.

Moreover, although the example in which the ink flows also after the stop of the circulation drive pump 408 due to the pressure difference between the two pressure control members is described in each of the aforementioned embodiments, the configuration is not limited to this example. The aforementioned embodiments can be applied to any form in which the movement of the ink does not stop immediately after the stop of the circulation drive pump 408 and the ink may flow.

Moreover, although a description is given of the example in which the cleaning is performed by generating negative pressure in the caps 211 that can be brought into contact with and separated from the print head 110 and sucking the inks from the ejection ports 402 in the aforementioned embodiments, other methods may be adopted as the cleaning. For example, pressurized recovery processing in which positive pressure is applied to the interior of the print head and the inks are forcedly discharged from the ejection ports by using this positive pressure can be executed as the cleaning.

Embodiments(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments(s) and/or that includes one or more circuits (e.g., an application specific integrated circuit (ASIC)) for performing the functions of one or more of the above-described embodiments (s), and by a method performed by the computer of the system or apparatus by, for example, reading out and executing the computer executable instructions from the storage medium to perform the functions of one or more of the above-described embodiments(s) and/or controlling the one or more circuits to perform the functions of one or more of the above-described embodiments(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A printing apparatus comprising:

an ejection unit configured to perform a print operation of forming an image on a print medium by ejecting liquid from an ejection port by using drive of an ejection energy generation element provided in a pressure chamber, the liquid flowing into the pressure chamber from a first flow passage;

a circulation unit configured to circulate the liquid in a circulation flow passage including the first flow passage, the pressure chamber, and a second flow passage configured to allow the liquid in the pressure chamber to flow to an outside of the pressure chamber;

a recovery unit configured to perform a recovery operation of the ejection unit; and a control unit configured to stop the circulation unit before completion of the print operation by the ejection unit in a case when the recovery operation is to be performed after the print operation, wherein the control unit stops the circulation unit before the completion of the print operation such that a flow velocity at a timing of the completion of the print operation is a flow velocity higher than a flow velocity at which an ejection characteristic is maintained.

2. The printing apparatus according to claim 1, wherein the control unit determines an execution timing of the recovery operation depending on a timing at which the circulation unit is stopped.

3. The printing apparatus according to claim 1, wherein the flow velocity at which the ejection characteristic is maintained varies depending on a print mode in which the print operation is performed.

4. The printing apparatus according to claim 1, wherein the flow velocity at which the ejection characteristic is maintained varies depending on a type of the liquid.

5. The printing apparatus according to claim 1, wherein the control unit causes the recovery unit to execute the recovery operation after a first time elapses, the first time being a time it takes for a flow velocity of the liquid in the circulation flow passage to reach or to fall below a predetermined flow velocity from the stop of the circulation unit.

6. The printing apparatus according to claim 5, wherein the predetermined flow velocity is a flow velocity that is determined depending on a type of the recovery unit and at which execution of the recovery operation is allowed.

7. The printing apparatus according to claim 5, wherein the control unit does not execute the recovery operation while the flow velocity is not equal to or lower than the predetermined flow velocity.

8. The printing apparatus according to claim 1, wherein the control unit is configured to execute the recovery operation after time obtained by adding a second time to a predetermined wait time elapses, the second time being a time it takes from the completion of the print operation to completion of a preliminary operation performed before the execution of the recovery operation by the recovery unit, and the predetermined wait time is determined based on a third time from the stop of the circulation unit to the completion of the print operation.

9. The printing apparatus according to claim 8, wherein the recovery unit executes the recovery operation depending on a type of the recovery operation, a member of the recovery unit, and a recovery sequence including a combination of the type of the recovery operation and the member of the recovery unit, and the second time varies depending on the recovery operation depending on the recovery sequence.

10. The printing apparatus according to claim 1, further comprising a print head including a plurality of the ejection units capable of ejecting multiple types of liquids, respectively, wherein the recovery unit applies the recovery operation to each of the plurality of ejection units, and the control unit determines a timing of the recovery operation common to the plurality of ejection units.

11. The printing apparatus according to claim 1, wherein, in the case when the recovery operation is a predetermined recovery operation, the control unit does not stop the circulation unit before the completion of the print operation.

12. The printing apparatus according to claim 11, wherein the predetermined recovery operation includes an operation of sucking the ejection unit.

13. The printing apparatus according to claim 1, wherein, in the case when the recovery operation is not to be performed after the print operation, the control unit does not stop the circulation unit before the completion of the print operation.

* * * * *